United States Patent

Togashi et al.

[11] Patent Number: 5,842,078
[45] Date of Patent: Nov. 24, 1998

[54] APPARATUS FOR GENERATING AN INTERRUPT BY COMPARING NEWLY RECEIVED, PRECEDING STORED, AND OPTIONAL DATA WHERE DESIGNATED STORING AREAS HAVE A PLURALITY OF SWITCHING

[75] Inventors: Tsuyoshi Togashi; Kazuya Sugita, both of Itami, Japan

[73] Assignees: Mitsubishi Denki Kabushiki Kaisha, Tokyo; Mitsubishi Electric Semiconductor Software Co., Ltd., Hyogo, both of Japan

[21] Appl. No.: 444,109

[22] Filed: May 18, 1995

[30] Foreign Application Priority Data

Jun. 10, 1994 [JP] Japan .................................. 6-128996

[51] Int. Cl.$^6$ ................................................ G06F 13/14
[52] U.S. Cl. ........................................ 395/868; 395/733
[58] Field of Search ........................... 395/200.01, 550; 377/39; 364/232.9, 242.1, 247, 251.3, 260

[56] References Cited

U.S. PATENT DOCUMENTS

| | | | |
|---|---|---|---|
| 3,334,334 | 8/1967 | Halpin | 395/733 |
| 3,344,406 | 9/1967 | Vinal | 29/407.09 |
| 3,350,694 | 10/1967 | Kusnick et al. | 395/437 |
| 3,378,641 | 4/1968 | Varsos et al. | 375/244 |
| 3,794,981 | 2/1974 | O'Connor | 395/800 |
| 3,947,673 | 3/1976 | Jordan et al. | 364/715.11 |
| 4,142,234 | 2/1979 | Bean et al. | 395/471 |
| 4,183,086 | 1/1980 | Kober et al. | 395/435 |
| 4,288,687 | 9/1981 | Zinn | 377/19 |
| 4,310,889 | 1/1982 | Imai et al. | 364/431.04 |
| 4,445,213 | 4/1984 | Baugh et al. | 370/405 |
| 4,470,111 | 9/1984 | Jenkins et al. | 395/861 |
| 4,742,452 | 5/1988 | Hirokawa | 395/280 |
| 4,751,673 | 6/1988 | Agarwal et al. | 340/146.2 |
| 4,807,117 | 2/1989 | Itoku et al. | 395/737 |
| 4,961,067 | 10/1990 | Suzuki | 340/146.2 |
| 4,989,223 | 1/1991 | Katayose et al. | 377/39 |
| 5,058,006 | 10/1991 | Durdan et al. | 395/449 |
| 5,337,168 | 8/1994 | Fujii et al. | 358/539 |
| 5,341,120 | 8/1994 | Nakajima | 340/146.2 |
| 5,373,448 | 12/1994 | Katogi et al. | 364/431.08 |
| 5,467,452 | 11/1995 | Blum et al. | 395/200.12 |
| 5,479,372 | 12/1995 | Sato et al. | 365/222 |

*Primary Examiner*—Thomas C. Lee
*Assistant Examiner*—Anderson I. Chen
*Attorney, Agent, or Firm*—McDermott, Will & Emery

[57] ABSTRACT

An interface apparatus, built in a microcomputer, and capable of reducing the load on a CPIU by including a function to judge by itself, when data is received from the outside, whether it is necessary for the received data to generate an interruption request so as to make the (CPU execute the processing, thereby avoiding the generation of an unnecessary interruption request. The interface apparatus is provided with a receiving register 3 which stores data received newly, a buffer register 4 which stores data received precedingly, a table 5 which stores data designated beforehand, and a comparing circuit 6 which compares the data stored in them with each other to make an interruption control register 7 generate an interruption request signal INT only when the comparison results do not show coincidence.

16 Claims, 15 Drawing Sheets

APPARATUS FOR GENERATING AN INTERRUPT BY COMPARING NEWLY RECEIVED, PRECEDING STORED, AND OPTIONAL DATA WHERE DESIGNATED STORING AREAS HAVE A PLURALITY OF SWITCHING

BACKGROUND OF THE INVENTION

1. Field of the Invention

The present invention relates to an interface apparatus built in a microcomputer, and more specifically to a so-called intelligence interface apparatus capable of reducing the load on a CPU for an interruption processing generated at the time of receiving data.

2. Description of the Related Art

A configuration example of a conventional receiving unit of an interface apparatus built in a microcomputer is shown in a block diagram of FIG. 1.

In FIG. 1, numeral 1 designates an entire conventional interface apparatus. The interface apparatus 1 comprises, a receiving terminal 2 for receiving data from the outside, a receiving register 3 for storing the data received by the receiving terminal 2, a buffer register 4 for storing the data received precedingly, and an interruption control register 7 for generating an internal interruption request (interruption request signal INT) to a CPU 100 at the time point when the data has been received from the outside.

The operation of such conventional interface apparatus is as follows.

The interface apparatus 1, when receiving data through the receiving terminal 2, stores the data temporarily in the receiving register 3, and transfers the data to the buffer register 4 in preparation for the next, receiving of data.

When the data has been transferred to the buffer register 4 from the receiving register 3, an interruption request bit in the interruption control register 7 is set to "1". Thereby, the interruption request signal INT is outputted to the CPU 100 from the interruption control register 7. Every time the interruption request signal INT is outputted from the interruption control register 7 of the interface apparatus 1 in such a manner, the CPU 100 executes the processings corresponding thereto.

Since the conventional interface apparatus is constituted and operates in such a way as mentioned above, every time data is received from the outside, the interruption request signal INT is generated so as to make the CPU execute the corresponding processings. And hence, the interruption request signal INT has always been generated even for the interruption request which is not necessary for the CPU to execute the processings. Thus, it was problematic in that the CPU is loaded unnecessarily, delaying the processing time.

SUMMARY OF THE INVENTION

The present invention has been devised to solve such problems as mentioned above, therefore, it is an object thereof to provide an interface apparatus capable of reducing the load of a CPU, by including a function to judge by itself whether or not it is necessary for the received data to generate an interruption request so as to make the CPU execute the processings, thereby not to generate the unnecessary interruption request to the CPU, when the interface apparatus built in a microcomputer receives data from the outside.

A first aspect, of the interface apparatus according to the present invention comprises, means for storing data which is newly received, means for storing data which was received precedingly, and means for storing data which has been designated beforehand, and comparing means for comparing the three data to generate an internal interruption signal only when they do not coincide with each other.

A second aspect of the interface apparatus according to the present invention is that, in addition to the first aspect, a plurality of data can be designated beforehand, and one out of them is selected, and is compared by the comparing means.

A third aspect of the interface apparatus according to the present invention is that, in addition to the first aspect, a plurality of data can be designated beforehand, and one or more out of them are selected for comparison by the comparing means.

A fourth aspect of the interface apparatus according to the present invention comprises, means for storing data which is newly received and means for storing data which has been designated beforehand, and comparing means for comparing the two data to generate an internal interruption signal only when they coincide with each other.

A fifth aspect of the interface apparatus according to the present invention is that, in addition to the fourth aspect, a plurality of data can be designated beforehand, and one out of them is selected for comparison by the comparing means.

A sixth aspect of the interface apparatus according to the present, invention is that, in addition to the fourth aspect, a plurality of data can be designated beforehand, and one or more out of them are selected for comparison by the comparing means.

A seventh aspect of the interface apparatus according to the present invention comprises, means for storing data which is newly received and means for storing data of two kinds of numeric values which have been designated beforehand, and comparing means for generating an internal interruption signal only when the data newly received is within a range of the data of two kinds of numeric values.

An eighth aspect of the interface apparatus according to the present invention is that, in addition to the seventh aspect, a combination of a plurality of numeric data can be designated beforehand, and one out of them is selected for comparison by the comparing means.

A ninth aspect of the interface apparatus according to the present invention is that, in addition to the seventh aspect, a combination of a plurality of numeric data can be designated beforehand, and one or more out of them are selected for comparison by comparing means.

A tenth aspect of the interface apparatus according to the present invention comprises, means for storing data which is newly received and means for storing data which was received precedingly, and comparing means for comparing the two data to generate an internal interruption signal only when they do not coincide with each other.

An 11th aspect of the interface apparatus according to the present invention comprises, means for storing data which is newly received and means for storing data which was received previously, and comparing means for comparing the two data to generate an internal interruption signal only when they coincide with each other.

A 12th aspect of the interface apparatus according to the present invention comprises, means for storing data which is newly received and means for storing data which was received precedingly, and counting mea s for counting the times of the cases where the two data coincide with each other after comparison so as to generate an internal interruption signal when reaching a predetermined value.

A 13th aspect of the interface apparatus according to the present invention comprises, means for storing data which is newly received and means for storing data which were received previously for several times, and counting means for comparing the data which is received newly and the plurality of data which were received previously for several times to generate an internal interruption signal only when the data received newly does not coincide with all of the data which were received previously.

In the first aspect of the interface apparatus according to the present, invention, the internal interruption signal is not to be generated when the data which is newly received, the data which was received previously and the data which has been designated beforehand coincide with each other.

In the second aspect of the interface apparatus according to the present invention, one out of a plurality of data which have been designated beforehand is selected for same operation as in the first, aspect.

In the third aspect of the interface apparatus according to the present invention, one or more data out of a plurality of data which have been designated beforehand are selected for same operation as in the first aspect.

In the fourth aspect of the interface apparatus according to the present invention, the internal interruption signal is not to be generated when the data which is newly received and the data which has been designated beforehand do not coincide with each other.

In the fifth aspect of the interface apparatus according to the present invention, one out of a plurality of data which have been designated beforehand is selected for same operation as in the fourth aspect.

In the sixth aspect of the interface apparatus according to the present invention, one or more out of a plurality of data which have been designated beforehand are selected for same operation as in the fourth aspect.

In the seventh aspect of the interface apparatus according to the present invention, the internal interruption signal is not to be generated when the data which is newly received is outside a range of the data of two kinds of numeric values which have been designated beforehand.

In the eighth aspect of the interface apparatus according to the present invention, a set of data of two kinds of numeric values of a plurality of combinations are selected for same operation as in the seventh aspect.

In the ninth aspect of the interface apparatus according to the present, invention, a set or more sets of the data of two kinds of numeric values of a plurality of combinations are selected for same operation as in the seventh aspect.

In the 10th aspect of the interface apparatus according to the present invention, the internal interruption signal is not to be generated when the data which is newly received and the data which was received precedingly coincide with each other after comparison.

In the 11th aspect of the interface apparatus according to the present invention, the internal interruption signal is not to be generated when the data which is newly received and the data which was received precedingly do not coincide with each other after comparison.

In the 12th aspect of the interface apparatus according to the present invention, the internal interruption signal is to be generated when the data which is newly received and the data which was received precedingly coincide with each other repetitively for predetermined times.

In the 13th aspect of the interface apparatus according to the present invention, the internal interruption signal is to be generated only when the data which is newly received does not coincide with all of the data which were received previously for several times.

The above and further objects and features of the invention will more fully be apparent, from the following detailed description with accompanying drawings.

DESCRIPTION OF THE PREFERRED EMBODIMENTS

Figure 1:
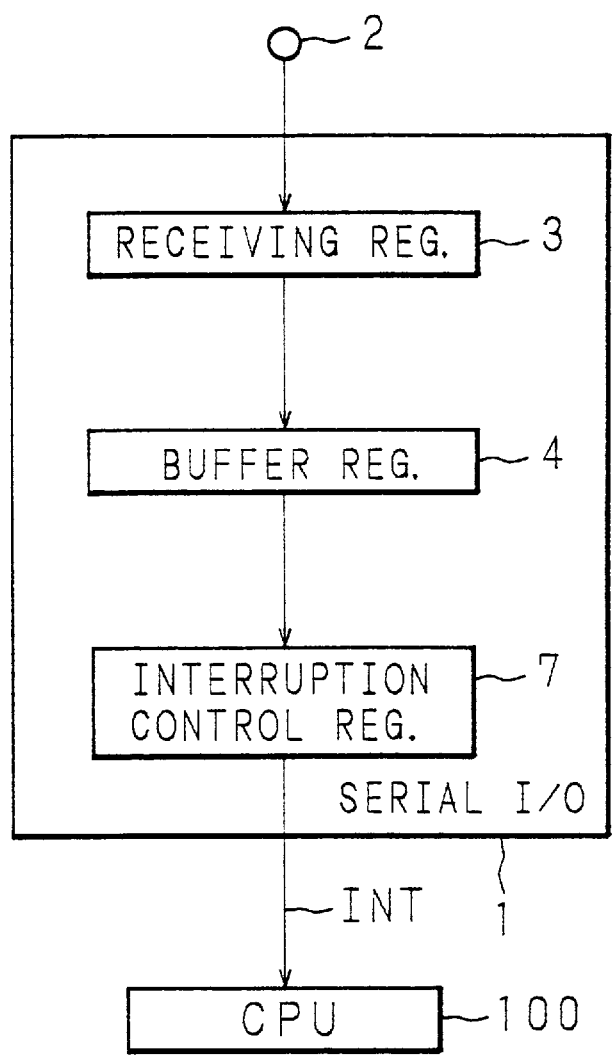
FIG. 1 is a block diagram showing a configuration example of a conventional general interface apparatus.

In the following, the present invention is particularly described referring to the drawings showing its embodiments thereof.

[First, Embodiment]

Figure 2:
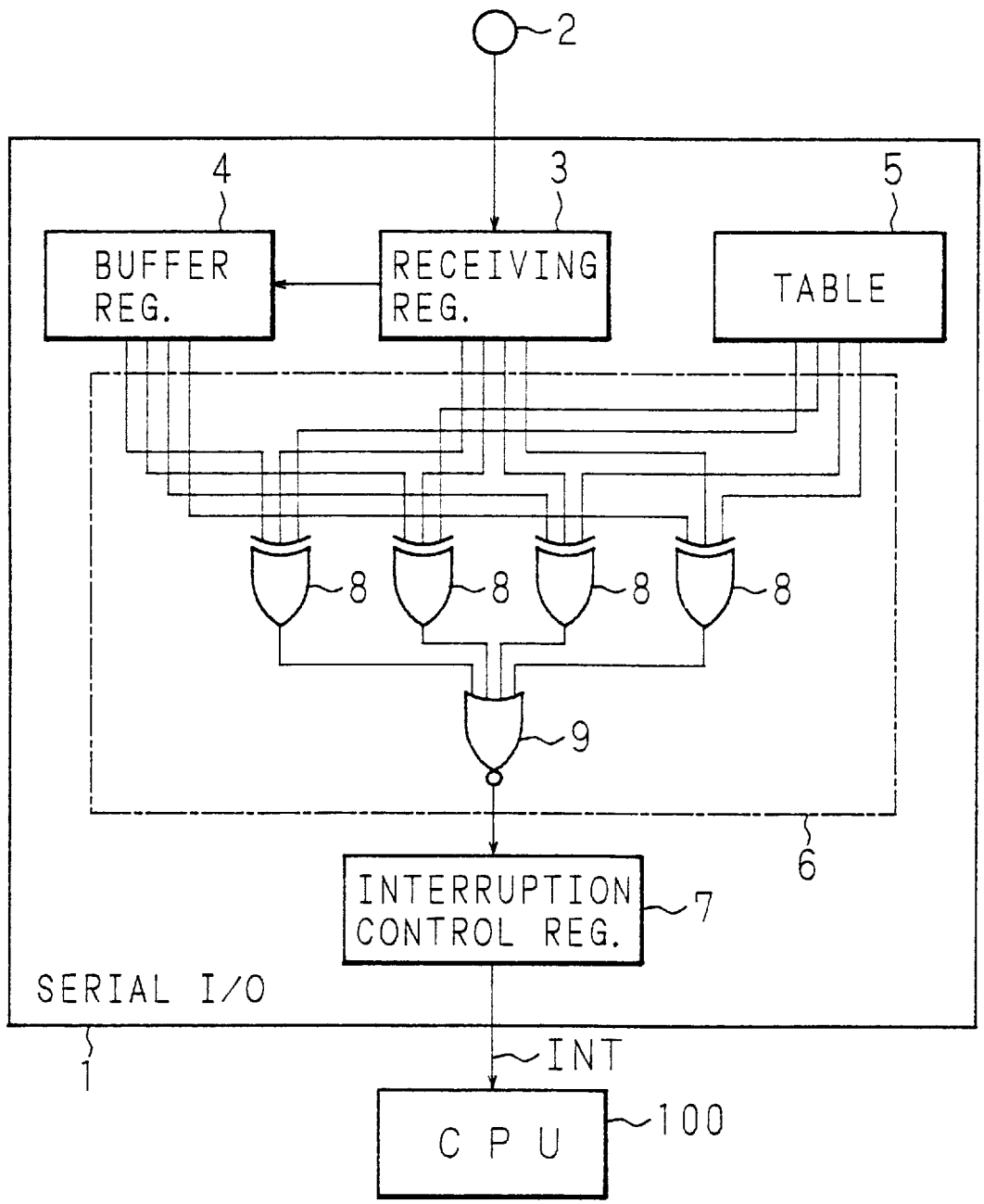
FIG. 2 is a block diagram showing a configuration example of a first embodiment of an interface apparatus of the present invent ion.

At first, a configuration example of a receiving unit, of a first aspect of an interface apparatus of the present invention built in a microcomputer is shown in a block diagram of FIG. 2.

In FIG. 2, numeral 1 designates an entire interface apparatus (hereinafter, referred to as a serial I/O) of the present invention. In the same way as in the aforementioned conventional interface apparatus, the serial I/O 1 of the present invention comprises, a receiving terminal 2 which receives data from the outside, a receiving register 3 which stores the data received by the receiving terminal 2, a buffer register 4 which stores the preceding received data, and an interruption control register 7 which generates an interruption request (interruption request signal INT) to a CPU 100 at the time point when the data has been received from the outside.

However, the serial I/O 1 of the present invention further comprises, a table 5 for storing data beforehand, which does not necessitate the interruption processing by the CPU 100 when the same data is received twice continuously, and a comparing circuit 6 for comparing data stored in the receiving register 3, data stored in the buffer register 4 and data stored in the above-mentioned table 5 beforehand.

While, in this embodiment, the configuration of the comparing circuit, 6 shown is the case where data received by the serial I/O 1 is a 4-bit, length. Thus, in the comparing circuit 6, the receiving register 3, buffer register 4 and table 5 have 4-bit configurations, respectively. Also, four XOR gates 8 of 3-input configuration, to which identical bits of the receiving register 3, bluffer register 4 and table 5 are inputted are included. A NOR gate 9 has a 4-input configuration for inputting the outputs of the four XOR gates 8, and an output, of the NOR gate 9 is given to the interruption control register 7 as an output signal of the comparing circuit, 6.

In the comparing circuit 6 having such a configuration, since the XOR gates X output a signal "0" only when their respective three inputs are all "1" or "0", when all bits of the data of the receiving register 3, buffer register 4 and table 5 are coincided to each other, all of the four inputs to the NOR gate 9 become "0" and the NOR gate 9 outputs a signal "1". While, since the signal "1" is outputted from either of the XOR gates 8 when even one bit of the three data is different, the NOR gate 9 outputs the signal "0".

The buffer register 4 is so constituted that, it is initialized by a reset signal, not shown, at the time of resetting the microcomputer, and thereafter, when necessary, optional data is stored by the CPU 100.

In the following, the operation of the first embodiment is described with reference to FIG. 2.

Now, in case of applying the first embodiment of the serial I/O of the present invention constituted as shown in FIG. 2 in a remote control system for controlling a VTR, as data which are to be stored in the table 5 beforehand, such data as commands for stopping and starting the play-back of a tape or a command for starting the video recording are considered.

In case of receiving the data of the commands as mentioned above continuously by the microcomputer of the VTR, the processings by the CPU 100 are identical and the second processing is not, necessary. Thus, such data are stored in the table 5 beforehand, and data sent from the outside is received via the receiving terminal 2 and stored in the receiving register 3. Then, bits of the three data of the receiving register 3, buffer register 4 and table 5 are compared with each other by the comparing register 6 so as not to operate to generate an unnecessary interruption request signal INT. In the following, explanation will be made specifically.

It is assumed, for example, that the VTR is in a quiescent state although a switch is on. When a play-back key of the remote control system is operated, the serial I/O 1 receives the data of the command for instructing the play-back of the tape from the receiving terminal 2 and stores it temporarily in the receiving register 3. In this case, since data other than the data instructing the tape play-back is stored in the buffer register 4, the comparison result of the data of the receiving register 3, buffer register 4 and table 5 do not coincide with each other and the signal "0" is outputted from the NOR gate 9. Thus, since the signal "0" is given to the interruption control register 7 from the comparing circuit 6, the interruption control register 7 generates the interruption request, signal INT. By receiving the interruption request signal INT, the CPU 100 executes the play-back processing of the tape.

When the comparison operation by the comparing circuit 6 is completed, in preparation for the next receiving operation, the data of the receiving register 3 is transferred to be stored in the buffer register 4.

When the play-back key of the remote control system is operated again in the state where the VTR is performing the tape play-back in such way, the serial I/O 1 receives the data of the command for instructing the tape play-back from the receiving terminal 2 and stores temporarily in the receiving register 3. However, in this case, the data instructing the tape play-back is stored also in the buffer register 4 already and also in the table 5 beforehand. And hence, the comparison result of all of data bits of the receiving register 3, buffer register 4 and table 5 performed by the comparing circuit, 6 coincide with each other, so that the signal "1" is outputted from the NOR gate 9. Thus, since the signal "1" is given to the interruption control register 7 from the comparing circuit 6, the interruption control register 7 never generates the interruption request signal INT and the CPU 100 never executes the interruption processing.

When the comparison operation by the comparing circuit 6 is completed, in the same way as in the case mentioned above, the data of the receiving register 3 is transferred to and stored in the buffer register 4 in preparation for the next receiving operation.

As mentioned above, ill the first embodiment of the serial I/0 1 of the present invention, when data not necessitating the interruption processing performed by the CPU 100 is stored in the table 5 beforehand in case of receiving the data twice continuously, it is possible to eliminate the unnecessary interruption request among t hose generated every time data is received as in the prior art, thus the load of the CPU is reduced.

[Second Embodiment]

Figure 3:
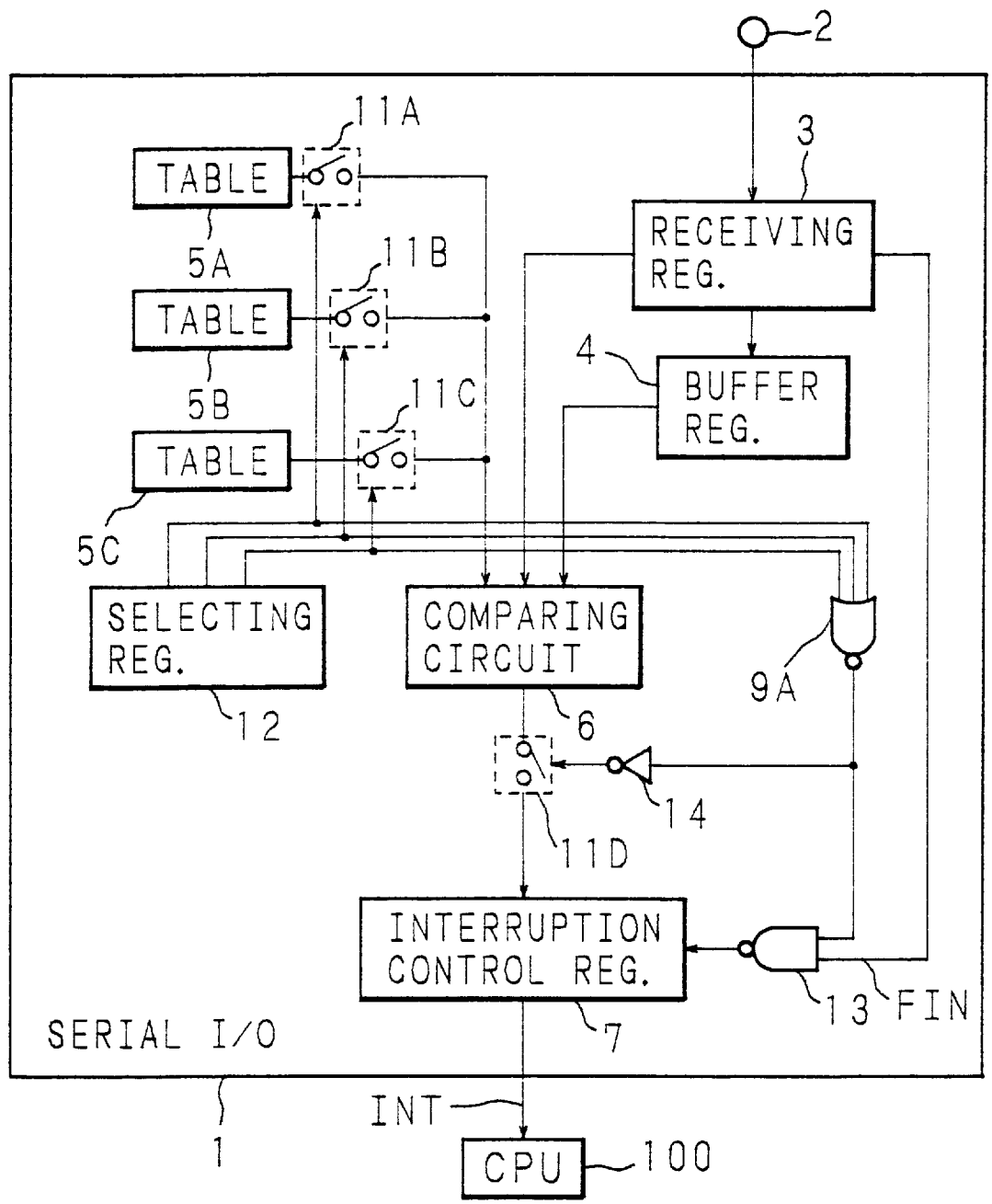
FIG. 3 is a block diagram showing a configuration example of a second embodiment of an interface apparatus of the present invention.

Next, a second embodiment of the serial 1/0 of the present invention is described with reference to a block diagram of FIG. 3 showing a configuration example of a receiving unit thereof.

The above-mentioned first embodiment is an example of the case where the number of the table storing beforehand the data not necessitating the interruption processing, when data of the receiving register 3 and that of the buffer register 4 are identical, is one.

However, in the second embodiment, it is constituted such that, by providing a plurality of such tables so as to select one of them, it is possible not to generate the interruption request for one of the plurality of data when receiving it twice continuously, and in the same way as in the prior art, it is possible to generate the interruption every time the data have been received.

In FIG. 3, numerals 5A, 5B, 5C respectively show the tables capable of storing three kinds of optional data beforehand. Outputs of the tables 5A, 5B, 5C are given to the comparing circuit 6 via switching circuits 11A, 11B, 11C, respectively.

The switching circuits 11A, 11B, 11C are ON/OFF controlled by a selecting register 12. Specifically, the selecting register 12 has a 3-bit configuration corresponding to the switching circuits 11A, 11B, 11C, whereby a bit 2 corresponds to the switching circuit, 11C, a bit 1 to the switching circuit 11B and a bit 0 to the switching circuit 11A. When the bit 0 is "1", the switching circuit 11A turns ON, and when "0", it turns OFF. When the bit 1 is "1", the switching circuit 11B turns ON, and when "0", it turns OFF. When the bit 2 is "1", the switching, circuit 11C turns ON, and when "0", it turns OFF.

The configuration and operation of the receiving register 3 and buffer register 4 are same as those in the first, embodiment,. Though it is same that the comparing circuit 6 compares data of the receiving register 3, buffer register 4 and one of the tables 5A, 5B, 5C, and that the output of the comparing circuit 6 is given to the interruption control register 7, a switching circuit 11D is provided between the comparing circuit, 6 and the interruption control register 7. The switching circuit 11D turns ON when an output of an inverter 14 is "1", and turns OFF when "0". An input of the inverter 14 is an output of a 3-input NOR gate 9A to which a 3-bit signal of the selecting register 12 is inputted, and the output of the NOR gate 9A and a reception finish signal FIN ("1" is outputted at, the end of data reception, and "0" is outputted when not yet, received) generated by the receiving register 3 when the data has been received are given to a 2-input NAND gate 13.

In the following, the operation of the second embodiment is described with reference to FIG. 3.

Now, in case of applying the second embodiment of the serial I/O of the present invention constituted as shown in FIG. 3 in the remote control system for controlling the VTR, as data which are to be stored in the table. 5A, 5B, 5C beforehand, for example, the data of the commands for stopping and starting the tape play-back and the command for starting the video recording are considered.

The processings by the CPU 100 in case of receiving the aforementioned data continuously by the microcomputer of the VTR are identical and the second processing is not necessary. Thus, by storing such data respectively intro the tables 5A, 5B, 5C beforehand and setting the selecting register 12 appropriately, the same operation as in the aforesaid first embodiment is possible for one of those data.

Specifically, as an example, the operation in case of selecting the table 5A is described.

When "0" is set in the bit 2, "0" is set in the bit 1 and "1" is set in the bit 0 of the register 12 (hereinafter, indicated as "001") beforehand, the signal "1" is given to the switching circuit 11A, the signa l "0" is given to the switching circuit 11B and the signal "0" is given to the switching circuit 11C. Thereby, only the switching circuit 11A turns ON and the switching circuits 11B, 11C become an OFF state, so that the data stored in the table 5A beforehand is given to the comparing circuit 6.

Since inputs to the 3-input NOR gate 9A are "0", "0", "1" in the same way as the signals given to the switching circuits 11A through 11C, the output of the NOR gate 9A becomes "0" and is given to the inverter 14 and NAND gate 13. Thereby, since the inverter 14 outputs the signal "1", the switching circuit 11D turns ON. Meanwhile, the signal "0" out putted from the NOR gate 9A and the reception finish signal FIN, which is outputted by the receiving register 3 when the data has been received, are inputted to the NAND gate 13. In this case, since the output, of the NAND gate 13 is always "I", the interruption control register 7 is never to generate the interruption request signal INT by this reception finish signal FIN. Thus, in this case, by responding only to the comparison result done by the comparing circuit 6, it is decided to generate the interrupt ion request signal INT.

As mentioned above, by setting data for the selecting register 12, one switching circuit, among the switching circuits 11A, 11B, 11C corresponding to one selected table and the switching circuit 11D turn ON and the other switching circuits become air OFF state, so that the data of one table among the three tables is given to the comparing circuit, 6. And hence, the same operation as in the aforesaid first embodiment is performed for the data which is among three kinds of data stored respectively in the tables 5A, 5B, 5C beforehand, written into one selected table beforehand.

It is to be understood that, by rewriting the content of the selecting register 12, the three kinds of data respectively set, in the tables 5A, 5B, 5C beforehand can be selected according to their use.

While, when none of the tables 5A, 5B, 5C is selected, all of the switching circuits 11A through 11C become an OFF state by setting "0" in the bits 0, 1, 2 of the selecting register 12, and "0" is inputted to all of the inputs of the 3-input NOR gate 9A. Thereby, since the output of the NOR gate 9A becomes "1" and the output of the inverter 14 becomes "0", the switching circuit, 11D turns OFF. Furthermore, since "1" is always inputted to the NAND gate 13 from the NOR gate 9A in this case, the output of the NAND gate 13 becomes an inverted signal of t he reception finish signal FIN generated by the receiving register 3.

Thus, when the data is sent from the remote control system and received by the receiving register 3 via the receiving terminal 2, "1" is outputted from the receiving register 3 as the reception finish signal FIN at the end of data reception, so that, the NAND gate 13 outputs "0" to the interruption control register 7, and the register 7, in turn, generates the interruption request signal INT.

[Third Embodiment]

In the aforementioned second embodiment, it is so constituted that only one out of the plurality of tables is selected, or in other words, only one data out of several kinds of data is selected, however, in the third embodiment, it is so constituted that all or some of the plurality of tables can be selected simultaneously. Also, in the same way as in the second embodiment, it is so constituted that the same operation as in the prior art is possible when none of the tables is selected.

In the following, the case of three tables is described.

Figure 4:
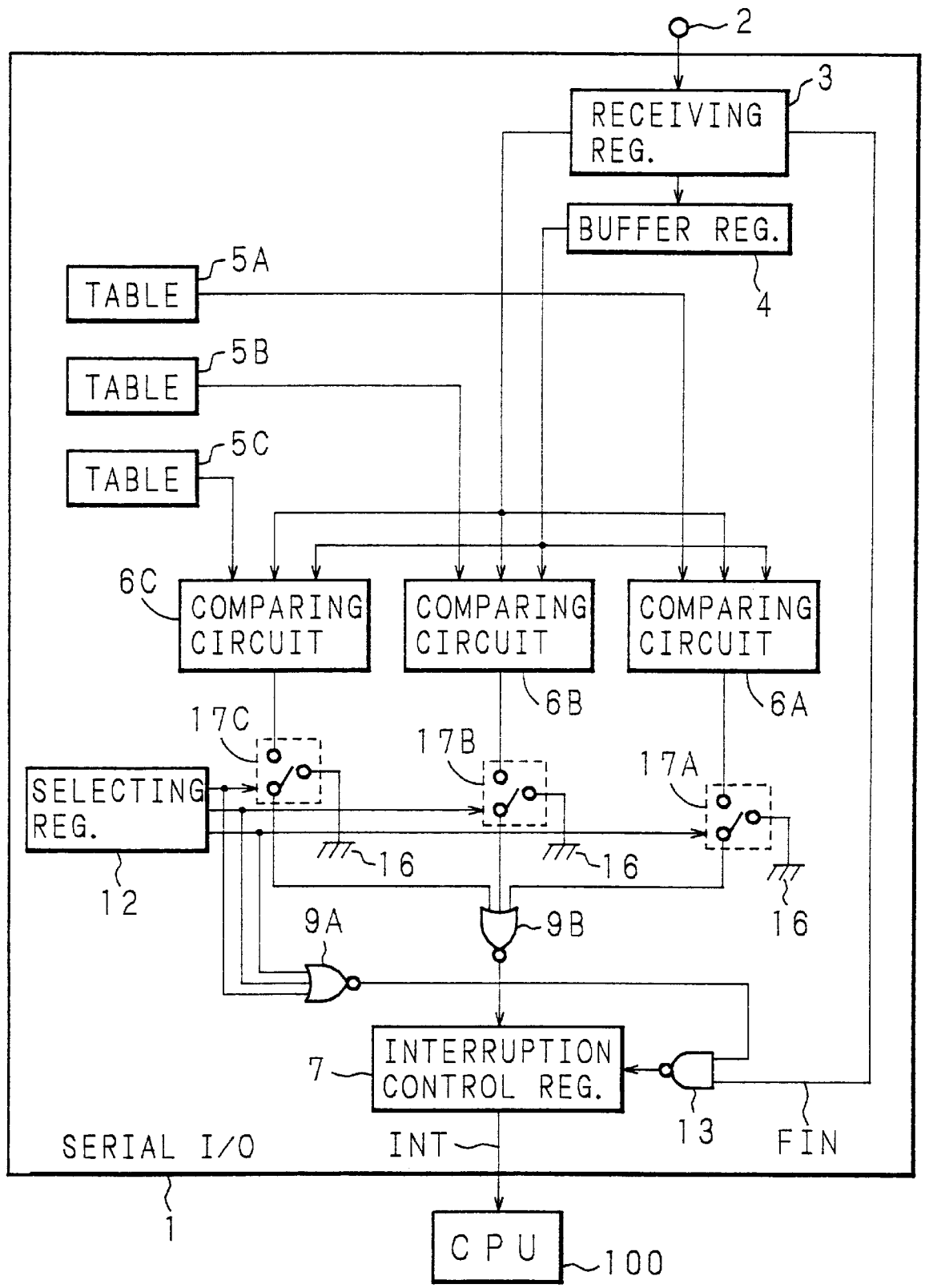
FIG. 4 is a block diagram showing a configuration example of a third embodiment of an interface apparatus of the present invent ion.

In FIG. 4, characters 5A, 5B, 5C respectively designate the table capable of storing three kinds of optional data beforehand in the same way as in the second embodiment.

In the third embodiment, also three comparing circuits 6A, 6B, 6C are provided corresponding to the tables 5A, 5B, 5C. To the comparing circuits 6A, 6b, 6C, data stored in the receiving register 3 and buffer register 4 are given commonly, as well as data stored in the table 5A is given to the comparing circuit 6A, data stored in the table 5B is given to the comparing circuit 6B and data stored in the table 5C is given to the comparing circuit 6C.

Thus, the comparing circuit 1A compares the data of the receiving register 3, buffer register 4 and table 5A, the comparing circuit 6B compares the data of the receiving register 3, buffer register 4 and table 5B, and the comparing circuit 5C compares the data of the receiving register 3, buffer register 4 and table 5C.

A signal of comparison result, by the comparing circuit 1A is inputted via a switching circuit 17A to a 3-input NOR gate 9B, a signal of comparison result by the comparing circuit 6B is inputted via a switching circuit 17B to the same, and a signal of comparison result, by the comparing circuit 6C is inputted via a switching circuit 17B to the same.

The switching circuits 17A, 17B, 17C are ON/OFF controlled by a selecting register 12. Specifically, the selecting register 12 has a 3-bit configuration corresponding to the switching circuits 17A, 17B, 17A, in which the bit 2 corresponds to the switching circuit 17C, the bit 1 to the switching circuit 17B and the bit 0 to the switching circuit 174. When the bit 0 is "1", the switching circuit 17A inputs an output of the comparing circuit 6A to the NOR gate 9B, and when "0", inputs the signal "0" to the same. When the bit 1 is "1", the switching circuit 17B inputs an output of the comparing circuit 6B to the NOR gate 9B, and when "0", inputs the signal "0" to the same. When the bit 2 is "1", the switching circuit, 17C inputs an output of the comparing circuit 6C to the NOR gate 9B, and when "t", inputs the signal "0" to the same.

The configuration and operation of the receiving register 3 and buffer register 4 are same as those in the first embodiment, except that their respective data outputs are given commonly to the comparing circuits 6A, 6B, 6C. An output of the NOR gate 9B is given to the interruption control resister 7.

Character 9A designates a 3-input NOR gate to which a 3-bit signal of the selecting register 12 is inputted. An output of the NOR gate 9A and the reception finish signal FIN ("1" is outputted at, the end of data reception, and "0" is outputted when not yet received) generated by the received register 3 when data has been received are given to a 2-input NAND gate 13.

In the following, the operation of the third embodiment is described with reference to FIG. 4.

Now, in case of applying the third embodiment of the serial I/O of the present invention constituted as shown in FIG. 4 in a remote control system for controlling a VTR, as data which are to be stored in the tables 5A, 5B, 5C beforehand, such data of commands for stopping and starting the tape play-back or a command for starting the video recording are considered.

In case of receiving the above-mentioned data continuously by the microcomputer of the VTR, the processings by the CPU 100 are identical and the second processing is not necessary. Thus, by storing such data into the tables 5A, 5B, 5C beforehand and setting the selecting register 12 appropriately, the same operation as in the aforesaid first embodiment is possible for all or some of the data. In the following, explanation will be made specifically.

As an example, the operation in case of selecting the tables 5A and 5B simultaneously is described.

When "011" is set in the bits 2, 1, 0 of the register 12 beforehand, the signal "1" is given to the switching circuit 17A, the signal "1" is given to the switching circuit 17B and the signal "0" is given to the switching circuit 17C. Thereby, since the switching circuits 17A and 17B turn ON and the other switching circuit 17C becomes an OFF state, the data stored in the table 5A beforehand is given to the comparing circuit 6A, and the data stored in the table 5B beforehand is given to the comparing circuit 6B.

Thus, the 3-input NOR gate 9B outputs the signal "0" and gives it to the interruption control register 7 when, at least, either of the comparison results of the comparing circuit, 6A or comparing circuit 6B showing coincidence (interruption is judged necessary).

Also, since inputs of the 3-input NOR gate 9A become "011", its output becomes "0". Thus, since the NAND gate 13 always outputs "1" irrespective of the reception finish signal FIN outputted by the receiving register 3, the interruption control register 7 is never to generate the interruption request signal INT by the reception finish signal FIN outputted from the receiving register 3.

Even when selecting the other table combination, or selecting only one of the tables, or selecting all of the tables, the same operation as mentioned above is possible by setting the appropriate data in the selecting register 12.

Meanwhile, when none of the tables 5A through 5C is used, by setting "000" in the selecting register 12 as the data, the switching circuits 17A through 17C output the signal "0", thus all of the three inputs of the NOR gate 9B become "0" and its output becomes "1", so that the output signal of the NOR gate 9B, or in other words, any of the comparison results done by the comparing circuits 6A, 6B, 6C has nothing to do with the interruption request signal INT of the interruption control register 7.

In such a case, since all of the three inputs of the NOR gate 9A become "0" and its output becomes "1", the output signal of the NAND gate 13 becomes an inverted signal of the reception finish signal FIN outputted from the receiving register 3. Thus, when the receiving register 3 outputs "1" at the end of data reception, the NAND gate 13 outputs the signal "0" to the interruption control register 7 to generate the interruption request signal INT.

[Fourth Embodiment]

Figure 5:
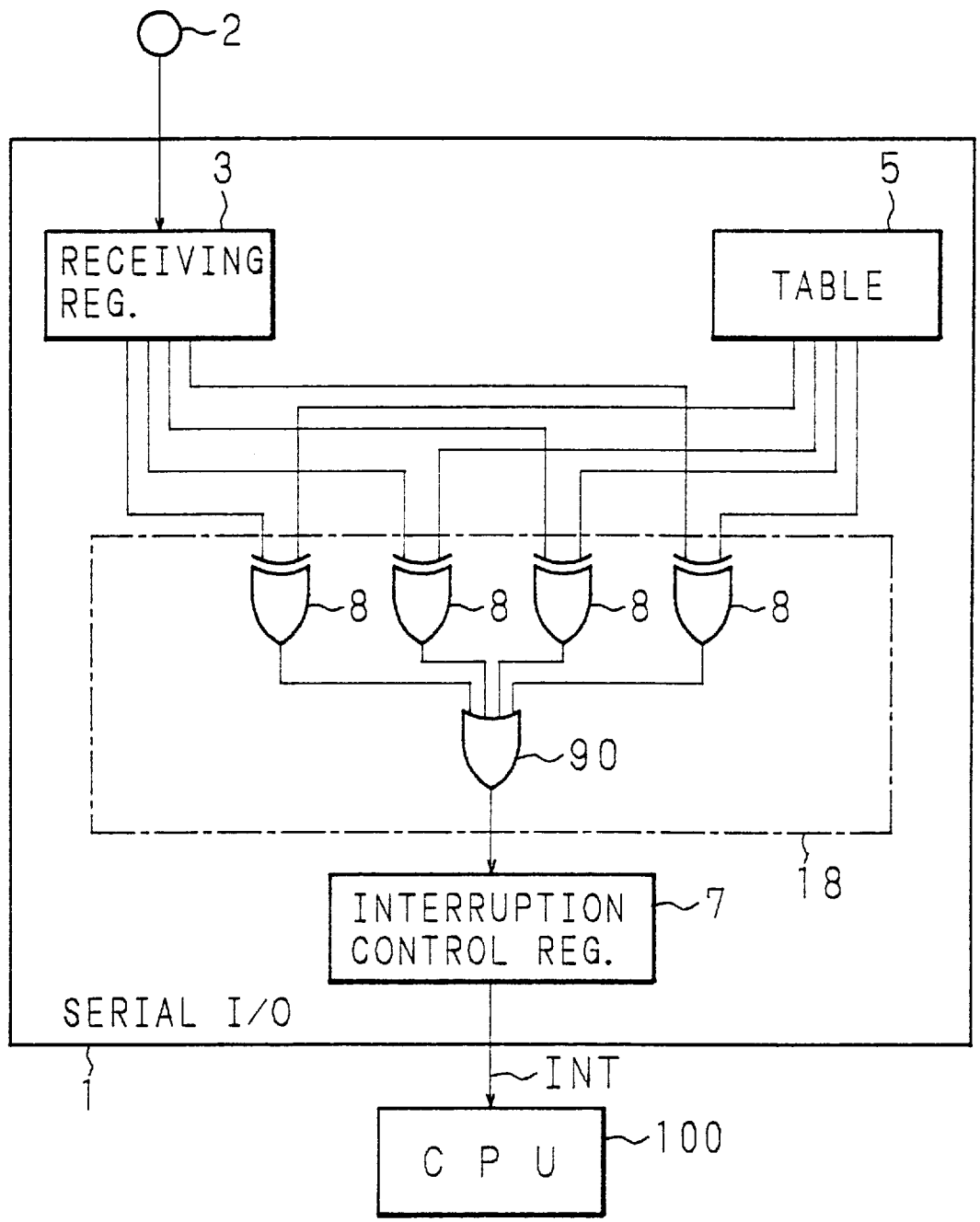
FIG. 5 is a block diagram showing a configuration example of a fourth embodiment of an interface apparatus of the present invention.

Next, a fourth embodiment of the serial I/O of the present invention is described with reference to a block diagram of FIG. 5 showing a configuration example of a receiving unit thereof.

For example, in case of applying the serial I/O of the present invention in the remote control system for controlling the VTR, when the VTR is not switched ON, only data of a command for instructing the switch-on next is meaningful and data of other commands are meaningless.

Thus, in the fourth embodiment, it is so constituted that, by storing the data of above-mentioned command for instructing the switch-on in the table 5 beforehand at the time point when the VTR is switched OFF, data of the receiving register 3 and that of the table 5 are compared to generate the interruption only when the comparison result coincides with each other.

In FIG. 5, numerals 3, 5 and 7, in the same way as in the aforementioned embodiments, respectively designate a receiving register, a table and an interruption control register. However, in the fourth embodiment, a buffer register designated by reference numeral 4 provided in the aforementioned embodiments is not included.

Besides, a comparing circuit designated by reference numeral 6 in the aforementioned embodiments is designated by reference numeral 18 in the fourth embodiment. To the comparing circuit 18, respective data bits of the receiving register 3 and those of the table 5 are inputted, and hence, each XOR gate 8 has 2-input configuration. Meanwhile, outputs of the XOR gates 8 are given to a 3-input OR gate 90. An output of the OR gate 90 is given to the interruption control register 7 as an output of the comparing circuit 18.

In such a comparing circuit 18, when two inputs to the XOR gates 8 coincide with each other, the outputs of all of the XOR gates 8 become "0" and the output of the OR gate 90 becomes "0", while when two inputs to any one of the XOR gates 8 do not coincide with each other, the output of the XOR gate 8 becomes "I" and the output of the OR gate 90 becomes "1". Thus, when data received from the receiving terminal 2 and stored in the receiving register 3 and data stored in the table 5 before-hand coincide with each other, the output of the OR gate 90 becomes "0" and the interruption request signal INT is generated by the interruption control register 7.

It is assumed that, for example, when the VTR is switched OFF, data of a command for instructing the switch-on is stored in the table 5 by the instruction of the CPU 100, an a switch-on key of the remote control system is operated when the VTR is switched OFF thereafter. The resulting data of the command for instructing the switch-on is received from the receiving terminal 2 and stored temporarily in the receiving register 3 and compared, by the comparing circuit 18, with the data of the command for instructing the switch-on stored in the table 5 beforehand. As a result of comparison by the comparing circuit 18, when all bits of the two data coincide with each other, the outputs of the XOR gates 8 in the comparing circuit 18 become "0" and signal "0" is outputted from the OR gate 90. Since this signal outputted from the OR gate 90 is given to the interruption control register 7, the register 7, in turn, generates the interruption request signal INT.

As a result of comparison by the comparing circuit 18, when even one bit, of the two data do not coincide with each other, this means that the received data is the data other than the command for instructing the switch-on, so that the signal "1" is outputted from the OR gate 90 and the interruption control register 7 is never to generate the reception finish signal FIN.

Thus, when the VTR is switched OFF and the serial I/O 1 of the present, invention receives the data of the command other than that instructing the switch-on, the interruption request signal INT is not, to be given to the CPU 100.

[Fifth Embodiment]

The above-mentioned fourth embodiment is the case where the number of the table storing the data, which generates the interruption processing when the data is same as the data of the receiving register 3, is one.

However, in the fifth embodiment, it is so constituted that, by providing a plurality of tables so as to select one out of them, it is possible too generate the interruption request when receiving the same data as one of a plurality of data, and in the same way as in the prior art, it is possible to generate the interruption at every end of data reception.

Figure 6:
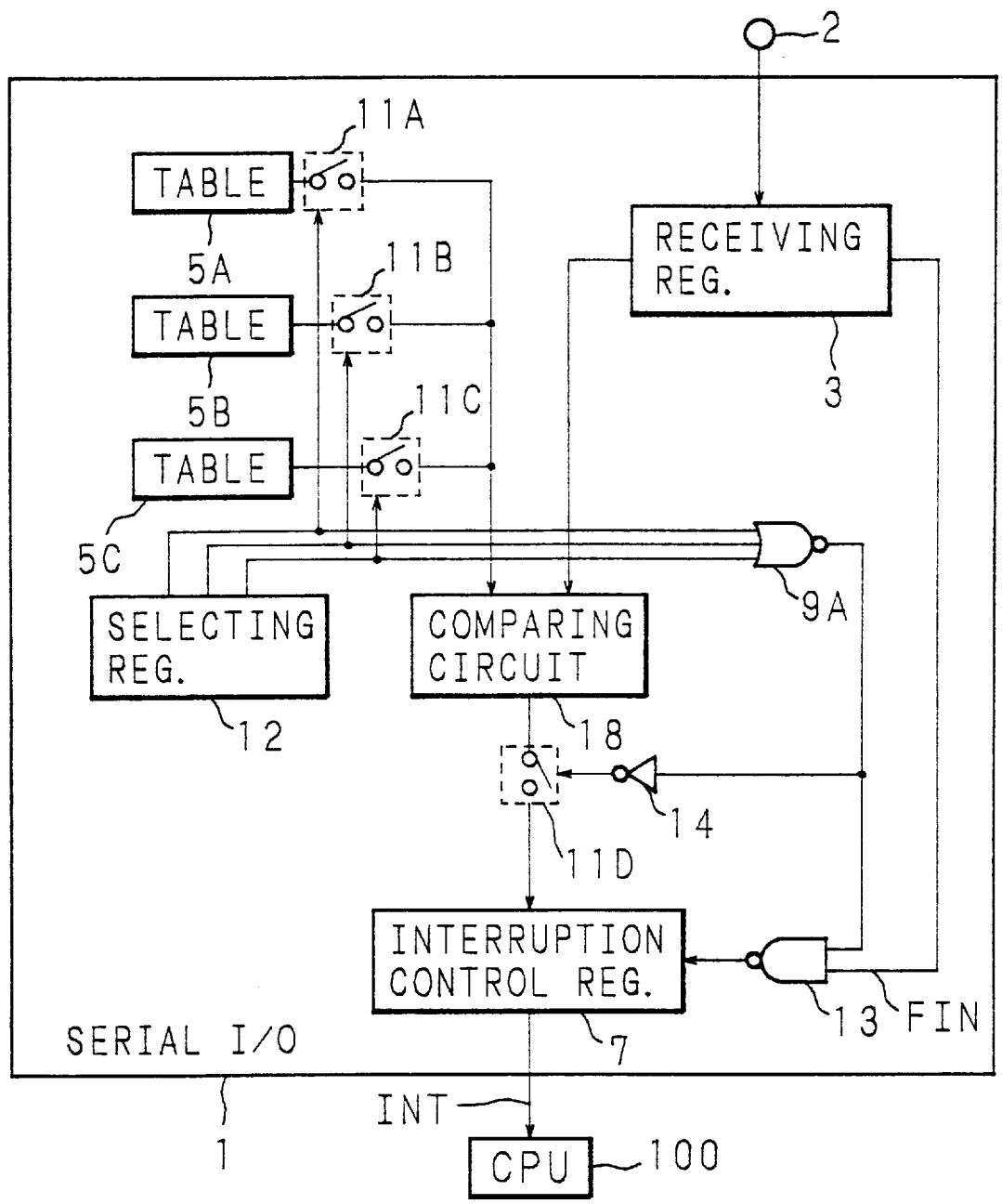
FIG. 6 is a block diagram showing a configuration example of a fifth embodiment of an interface apparatus of the present invention.

In FIG. 6, numerals 5A, 5B, 5C respectively designate the tables capable of storing three kinds of optional data beforehand. Outputs of the tables 5A, 5B, 5C are given to a comparing circuit 18 via switching circuits 11A, 11B, 11C, respectively.

The switching circuits 11A, 11B, 11C are ON/OFF controlled by a selecting register 12. Specifically, the se-1 cting register 12 has a 3-bit configuration corresponding to the switching circuits 11A, 11B, 11C, in which a bit 2 corresponds to the switching circuit 11C, a bit 1 to the switching circuit 11B and a bit 0 to the switching circuit 11A. When the bit 0 is "1", the switching circuit 11A turns ON, and when "0" it, turns OFF. When the bit, 1 is "1", the switching circuit 11B turns ON, and when "0", it turns OFF. When the bit 2 is "1", the switching circuit 11C turns ON, and when "0", it, turns OFF.

The configuration and operation of the receiving register 3 is same as the fourth embodiment. It is also same that a comparing circuit, 18 compares data of the receiving register 3 and data of one of the tables 5A, 5B, 5C, and when they coincide with each other, outputs the signal "0", when they do not coincide, outputs the signal "1". Though it is also same that the output, of the comparing circuit 18 is given to the interruption control register 7, a switching circuit 11D is provided between the comparing circuit 18 and the interruption control register 7. The switching circuit 11D turns ON when an output of an inverter 14 is "1", and turns OFF when "0". An input of the inverter 14 is an output of a 3-input NOR gate 9A, to which a 3-bit signal of the selecting register 12 is inputted, and the output of the NOR gate 9A and a reception finish signal FIN ("1" is outputted at the end of data reception, and "0" is outputted when not yet received) generated by the receiving register 3 when data has been received are given to a 2-input NAND gate 13.

In the following, the operation of the fifth embodiment is described with reference to FIG. 6.

Now, in case of applying the fifth embodiment of the serial I/O of the present invention constituted as shown in FIG. 6 in the remote control system for controlling the VTR, as data which are to be stored in the tables 5A, 5B, 5C beforehand, for example, a command for instructing the switch-on when the VTR is switched OFF, a command for instructing reservation of video recording when the VTR is switched OFF and a command for instructing the time adjustment when the VTR is switched OFF are considered.

When data as mentioned above are received when the VTR is switched OFF, processings by the CPU 100 are necessary. Thus, by storing such data in the tables 5A, 5B, 5C beforehand at the time point when the VTR is switched OFF and setting the selecting register 12 appropriately, the same operation as in the aforementioned fourth embodiment is possible for any one of those data. In the following, explanation will be given specifically.

As an example, the operation in the case of selecting the table 5A is described.

When "0" is set in the bit 2, "0" is set in the bit 1 and "1" is set in the bit 0 of the register 12 (hereinafter, indicated as "001") beforehand, the signal "1" is given to the switching circuit 11A, the signal "0" is given to the switching 11B and the signal "0" is given to the switching circuit 11C. Thereby, since only the switching circuit 11A turns ON and the other switching circuits 11B, 11C become an OFF state, the data stored in the table 5A beforehand is given to the comparing circuit 18.

Since the inputs to the 3-input NOR gate 9A become "0", "0", "1" in the same way as the signals given to the switching circuits 11A through 11C, the output of the NOR gate 9A becomes "0" and is given to the inverter 14 and the NAND gate 13. Thereby, the inverter 14 outputs the signal "1", so that the switching circuit 11D turns ON. Meanwhile, the signal "0" outputted from the NOR gate 9A and the reception finish signal FIN generated by the receiving register 3 at the end of data reception are inputted to the NAND gate 13. In this case, since the output of the NAND gate 13 is always "1", the interruption control register 7 is never to generate the interruption request signal INT by the reception finish signal FIN. Thus, in this case, by responding only to the comparison result done by the comparing circuit 18, it is decided to generate the interruption request signal INT.

As mentioned above, by setting data for the selecting register 12, one switching circuit among the switching circuits 11A, 11B, 11C, corresponding to one selected table and the switching circuit 11D turn ON and the other switching circuits become an OFF state, so that the data of one table among the three tables is given to the comparing circuit 18. And hence, the same operation as in the aforesaid fourth embodiment is performed for the data which is among three kinds of data stored respectively in the tables 5A, 5B, 5C beforehand, and is written into one selected table beforehand.

It is to be understood that, by rewriting the content of the selecting register 12, the three kinds of data set in the tables 5A, 5B, 5C beforehand can be selected according to their use.

While, when none of the tables 5A, 5B, 5C is selected, all of the switching circuits 11A through 11C become an OFF state by setting "0" to the bits 0, 1, 2 of the selecting register 12, and "0" is inputted to all of the inputs of the 3-input NOR gate 9A. Thereby, since the output of the NOR gate 9A becomes "1" and the output of the inverter 14 becomes "0", the switching circuit 11D turns OFF. Furthermore, since "1" is always inputted to the NAND gate 13 from the NOR gate 9A in this case, the output of the NAND gate 13 becomes an inverted signal of the reception finish signal FIN generated by the receiving register 3.

Thus, when data is sent from the remote control system and received by the receiving register 3 via the receiving terminal 2, "1" is outputted from the receiving register 3 as the reception finish signal FIN at the end of data reception, so that the NAND gate 13 outputs "0" to the interruption control register 7, and the register 7, in turn, generates the interruption request signal INT.

In such a way, in the fifth embodiment, by storing data of the command for instructing the switch-on when the VTR is switched OFF, the command for instructing reservation of the video recording when the VTR is switched OFF and the command for instructing the time adjustment when the VTR is switched OFF in the tables 5A, 5B, 5C beforehand, and setting the data of the selecting register 12 to select any one of the commands, the interruption request signal INT is never to be generated for the other commands when the VTR is switched OFF.

[Sixth Embodiment]

In the aforementioned fifth embodiment, though it is so constituted that one out of a plurality of tables is selected, in other words, one data out of several kinds of data is selected, in the sixth embodiment, it is so constituted that all or some of the tables can be selected simultaneously. Also, in the same way as in the fifth embodiment, it is so constituted that the same operation as in the prior art is possible when all of the tables are not selected.

In the following, the case of three tables is described.

Figure 7:
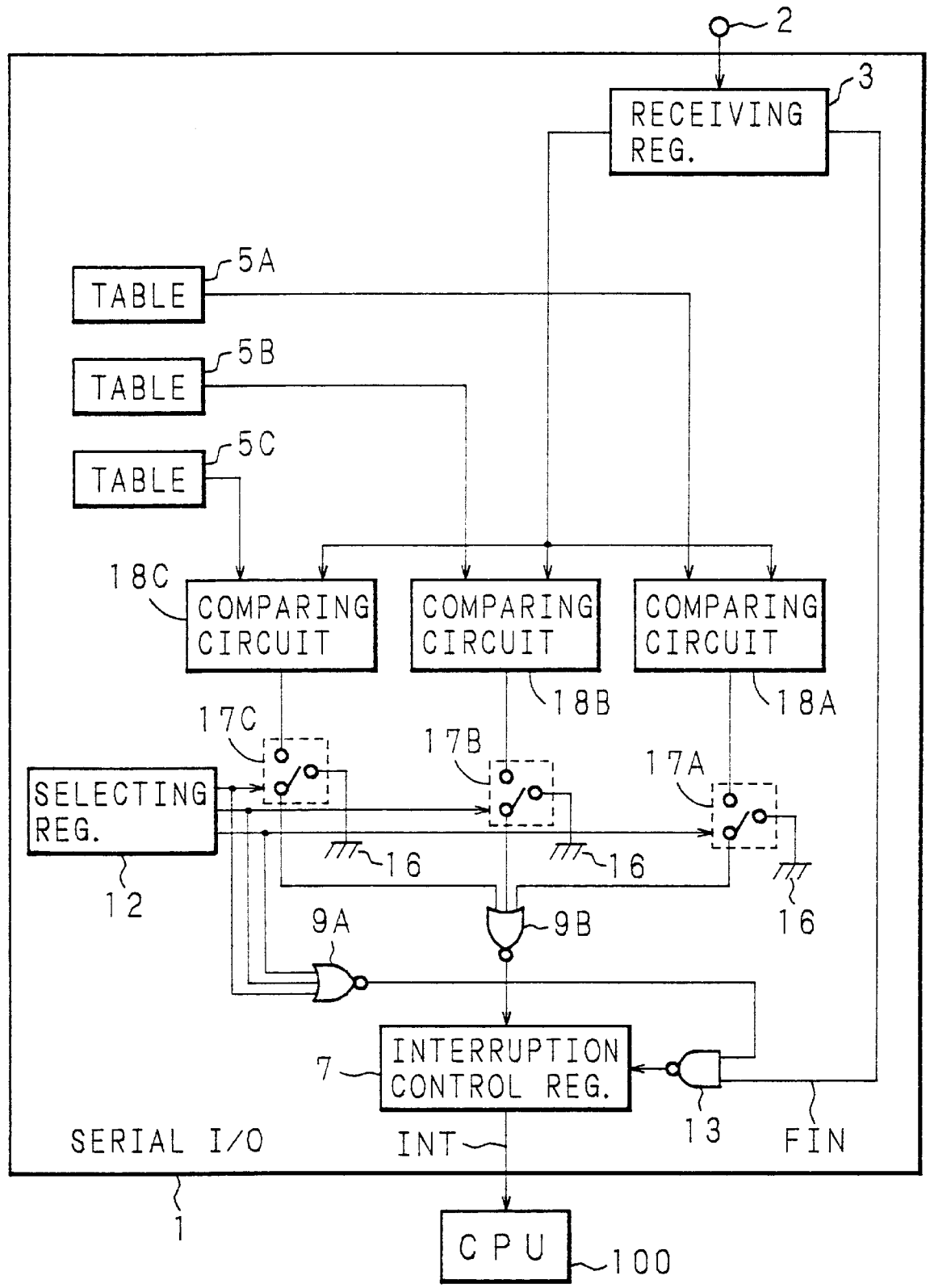
FIG. 7 is a block diagram showing a configuration example of a sixth embodiment of an interface apparatus of the present invention.

In FIG. 7, characters 5A, 5B, 5C respectively designate the tables capable of storing three kinds of optional data in the same way as in the fifth embodiment.

In the sixth embodiment, three comparing circuits 18A, 18B, 18C are provided corresponding to the tables 5A, 5B, 5C. To the comparing circuits 18A, 18B, 1C, data stored in the receiving register 3 are given commonly, as well as data stored in the table 5A is given to the comparing circuit 18A, data stored in the table 5B is given to the comparing circuit 18B and data stored in the table 5C is given to the comparing circuit 18C.

Thus, the comparing circuit, 18A compares the data of the receiving register 3 and table 5A, the comparing circuit 18B compares the data of the receiving register 3 and table 5B and the comparing circuit 18C compares the data of the receiving register 3 and table 5C.

The configuration of the comparing circuits 18A, 18B, 18C is same as the comparing circuit 18 of the third embodiment shown in FIG. 5.

A signal of comparison result of the comparing circuit 18A is inputted to the 3-input NOR gate 9B via a switching circuit 17A, a signal of comparison result of the comparing circuit 18B is inputted to the same via a switching circuit 17B and a signal of comparison result of the comparing circuit 18C is inputted to the same via a switching circuit 17C.

The switching circuits 17A, 17B, 17C are ON/OFF controlled by the selecting register 12. Specifically, the selecting register 12 has a 3-bit configuration corresponding to the switching circuits 17A, 17B, 17C, in which a bit 2 corresponds to the switching circuit 17C, a bit 1 corresponds to the switching circuit 17B and a bit 0 corresponds to the switching circuit 17A. When the bit 0 is "1", the switching circuit 17A inputs an output of the comparing circuit 18A to the NOR gate 9B, and when "0", inputs the signal "0" to the NOR gate 9B. When the bit 1 is "1", the switching circuit 17B inputs an output of the comparing circuit 18B to the NOR gate 9B, and when "0", inputs the signal "0" to the NOR gate 911. When the bit 2 is "1", the switching circuit 17C inputs an output of the comparing circuit 18C to the NOR gate 9B, and when "0", inputs the signal "0" to the NOR gate 9B.

The operation and configuration of the receiving register 3 are same as in the first embodiment except that its data is given commonly to the comparing circuits 18A, 18B, 18C. An output of the NOR gate 9B is given to the interruption control register 7.

Also, character 9A designates a 3-input NOR gate to which a 3-bit signal of the selecting register 12 is inputted. An output of the NOR gate 9A and a reception finish signal FIN ("1" is outputted at the end of data reception, and "0" is outputted when not, yet received) generated by the receiving register 3 at the end of data reception are given to a 2-input NAND gate 13.

In the following, the operation of the sixth embodiment is described with reference to FIG. 7.

In the sixth embodiment, it is assumed that data stored in the comparing circuits 18 beforehand at the time point when the VTR is switched OFF are same as in the aforementioned fifth embodiment.

As an example, the operation in case of selecting the tables 5A and 5B at the same time is described.

When "011" is set to the bits 2, 1, 0 of the register 12 beforehand, the signal "1" is given to the switching circuit 17A, the signal "1" is given to the switching circuit 17B and the signal "0" is given to the switching circuit 17C. Thereby, since the switching circuits 17A and 17B turn ON and the other switching circuit 17C becomes an OFF state, the data stored in the table 5A beforehand is given to the comparing circuit 18A, and the data stored in the table 5B beforehand is given to the comparing circuit 18B.

Thus, when, at least, either of the comparison result of the comparing circuit 18A or that of comparing circuit, 18B shows coincidence (when the interruption is necessary), the 3-input NOR gate 9B outputs the signal "0" and gives it, to the interruption control register 7.

Also, since the inputs of the 3-input NOR gate 9A become "011", its output becomes "0". Thus, since the NAND gate 13 always outputs "1" irrespective of the reception finish signal FIN outputted by the receiving register 3, the interruption control register 7 is never to generate the interruption request signal INT by the reception finish signal FIN outputted from the receiving register 3.

Even when selecting the other combination of tables, or selecting only any one of the tables, or selecting all of the tables, the same operation as mentioned above is possible by setting the appropriate data in the selecting register 12.

Meanwhile, when none of the tables 5A through 5C is used, by setting "000" in the selecting register 12 as the data, all of the switching circuits 17A through 17C output the signal "0" thus all of the three inputs of the NOR gate 9B become "0" and its output becomes "1", so that the output signal of the NOR gate 9B, in other words, any o f the comparison results done by the comparing circuits 18A, 18B, 18C has nothing to do with the interruption request signal INT of the interruption control register 7.

In su c h a case, since all of the three inputs of the NOR gate 9A become "0" and its output becomes "0" the output signal of the NAND gate 13 becomes an inverted signal of the reception finish signal FIN outputted from the receiving register 3. Thus, when the receiving register 3 outputs "1" at the end of data reception, the NAND gate 13 outputs the signal "0" to the interruption control register 7 to generate the interruption request signal INT.

[Seventh Embodiment]

In the above-mentioned sixth embodiment, though it is so constituted that data is stored respectively in the three tables 5A, 5B, 5C beforehand, it is also possible to constitute for a plurality of data by designating a range of the data value.

In the following, such a seventh embodiment of the serial I/O of the present invention is described with reference to FIG. 8.

For example, when data sent to the serial I/O of the present, invention from the outside has an 8-bit length, a range of data is "00H" through "FFH" (H represents a hexadecimal number), but when the data range necessary to be processed by the CPU is "00H" through "10H", a minimum value "00H" is stored in the table 5A and a maximum value "10H" is stored in the table 5B before starting the receiving operation.

Figure 8:
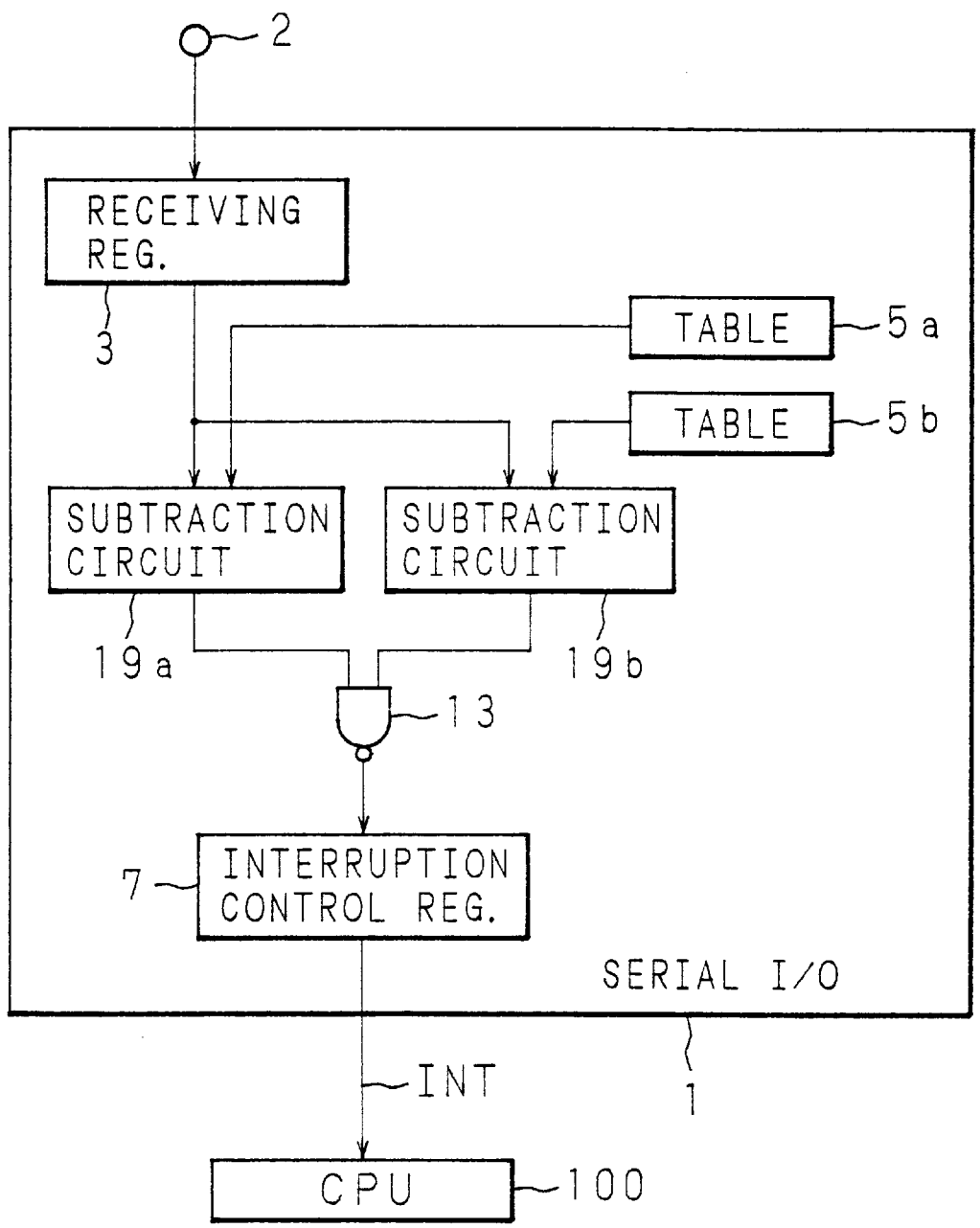
FIG. 8 is a block diagram showing a configuration example of a seventh embodiment of an interface apparatus of the present invention.

In FIG. 8, characters 19A, 19B respectively designate subtraction circuits. The subtraction circuit 19A performs subtraction between data stored in the receiving register 3 and data stored in the table 5 beforehand, and the subtraction circuit 19B performs subtraction between the data stored in the receiving register 3 and data stored in the table 5B beforehand.

Carries as the result of subtraction by the subtraction circuits 19A, 19B are given to a 2-input NAND gate 13, the output signal of the NAND gate 13 being given to the interruption control register 7.

An exclusive circuit for the subtraction circuits 19A, 19B need not be prepared, but for example, an input of a well-known conventional ALU circuit may be fixed for exclusive subtraction use.

Next, the operation of the seventh embodiment of the serial I/O of the present, invention is described with reference to FIG. 8.

At first, referring to the comparing operation by the subtraction circuits 19A, 19B, in order to judge whether or not the data of the receiving register 3 inputted to the subtraction circuit 19A is more than the data stored in the table 5A beforehand, the following operation is executed in the subtraction circuit, 19A.

"data of the receiving register 3"
+"a correction value of data of the table 5A"
+1

When the operation result is in accordance with the conditions, "1" is set in a carry flag of the subtraction circuit 19A.

Also, in order to judge whether or not the data stored in the table 5B beforehand and inputted to the subtraction circuit 19B is more than the data of the receiving register 3, the same operation as mentioned above is executed. When "1" is set in the carry flags of both the subtraction circuits 19A and 19B, it is judged that the received data stored in the receiving register 3 is within the range of the data set in the tables 5A, 5B. In this case, an output of the NAND gate 13 becomes "0" and the interruption request signal INT is generated from the interruption control register 7.

When the received data stored in the receiving register 3 is outside the range of "00H" through "10H", since either of the carry flags of the subtraction circuits 19A, 19B is not set to "1", the output signal of the NAND gate 13 becomes "1" and the interruption request, signal INT is not, to be generated by the interruption control register 7.

[Eighth Embodiment]

In the above-mentioned seventh embodiment, a set range of the received data is restricted to one range stored in the tables 5A, 5B. On the contrary, in the eighth embodiment, it is so constituted that, a plurality of sets of tables (in an example shown in FIG. 9, there are three sets of tables designated respectively by characters 5A and 5D, 5B and 5E, 5C and 5F) are provided, and any one set among them is selected by the s electing register 12 and the switching circuits 11A through 11F. By adopting such configuration, it is possible to change the set range of the received data only by rewriting the content of the selecting register 12, as far as it is within the range stored in the sets of tables beforehand.

Figure 9:
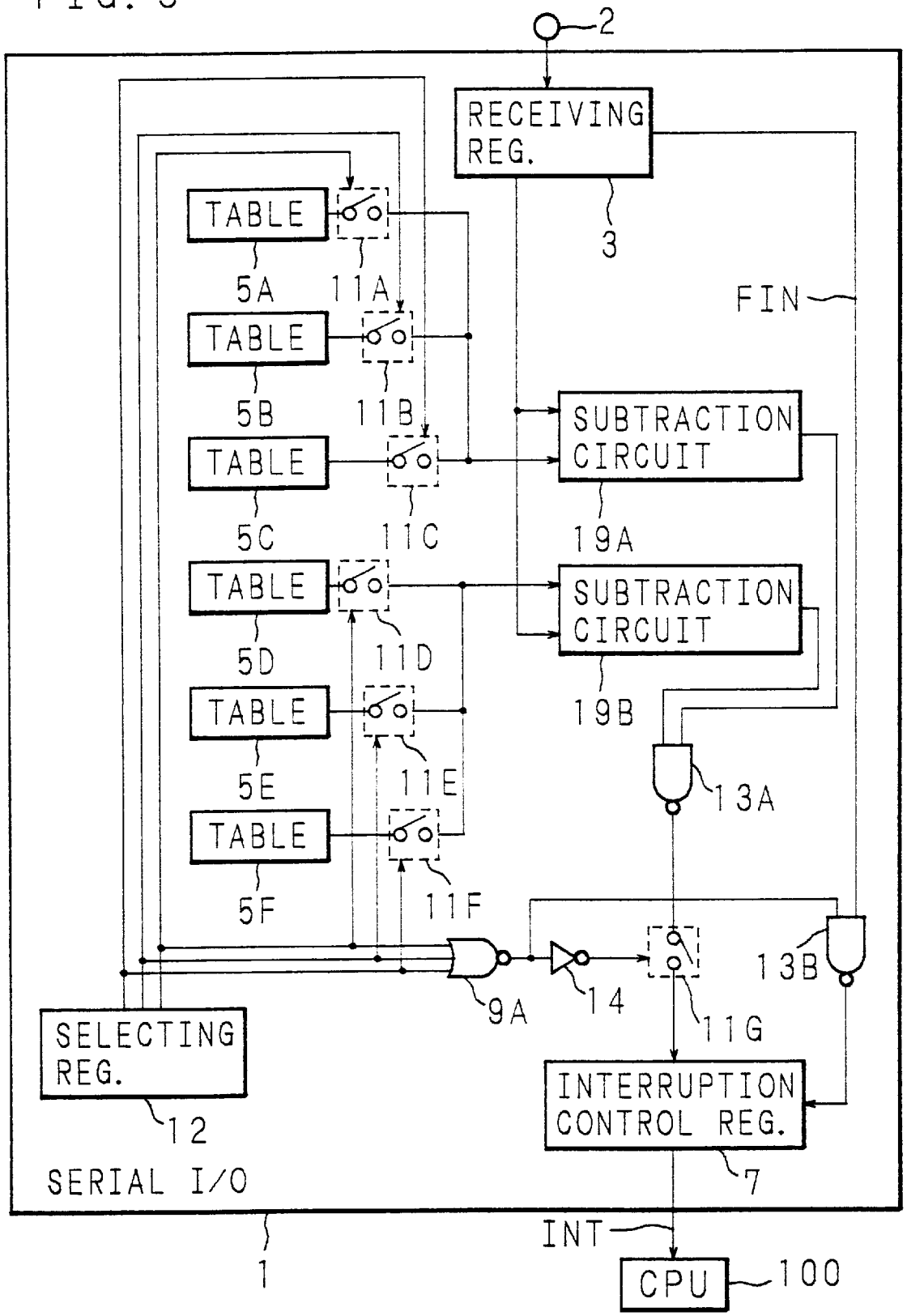
FIG. 9 is a block diagram showing a configuration example of an eighth embodiment of an interface apparatus of the present invention.

In FIG. 9, characters 5A, 5B, 5C, 5D, 5E, 5F respectively designate the tales capable of storing optional data the rein beforehand. Outputs of the tables 5A, 5B, 5C are given to the subtraction circuit 19A via the switching circuits 11A, 11B, 11C, and outputs of the tables 5D, 5E, 5F are given to the subtraction circuit 19B via the switching circuits 11D, 11E, 11F.

The switching circuits 11A, 11B, 11C, 11D, 11E, 11F are ON/OFF controlled by the selecting register 12. Specifically, the selecting register 12 has a 3-bit configuration corresponding to the switching circuits 11A and 11D, 11B and 11E, 11C and 11F. More specifically, when a bit 0 is "1", the switching circuits 11A and 11D turn ON, and when "0", they turn OFF. When a bit 1 is "1", the switching circuits 11B and 11E turn ON, and when "0", t hey turn OFF. When a bit 2 is "1", the switching circuits 11C and 11F turn ON, and when "0", they turn OFF.

The configuration and operation of the receiving register 3 and the subtraction circuits 19A, 19B are same as in the seventh embodiment. It is also same that outputs of the subtraction circuits 19A, 19B are given to the interruption control register 7 via the NAND gate 13A, but a switching circuit 11G is provided between the NAND gate 13A and the interruption control register 7. The switching circuit 11G turns ON when an output of the inverter 14 is "1" and turns OFF when it is "0". An input of the inverter 14 is an output of the 3-input NOR gate A to which a 3-bit signal of the selecting register 12 is inputted. The output of the NOR gate 9A and a reception finish signal FIN ("1" is outputted at the end of data reception, and "0" is outputted when not yet received) generated by the receiling register 3 at the end of data reception are given to the 2-input NAND gate 13B.

In the following, the operation of the eighth embodiment is described with reference to FIG. 9. As an example, the operation in case of selecting the tables 5A and 5D is described.

For example, when data sent to the serial I/O 1 of the present invention from the outside are consisting of three kinds of data A ("00H" through "10"), data B ("20H" through "30H ") and data C ("40H" through "50H"), before starting the receiving operation, minimum values "00H" (a minimum value of the data A), "20H" (a minimum value of the data B) and "40H" (a minimum value of the data C), are stored respectively in the tables 5A, 5B, 5C, and maximum values, "10H" (a maximum value of the data A), "30H" (a maximum value of the data B) and "50H" (a maximum value of the data C) are, similarly, stored respectively in the tables 5D, 5E, 5F.

When "0" is set in the bit 2, "0" is set in the bit 1 and "1" is set in the bit 0 of the register 12, or data "001" are set beforehand, the signal "1" is given to the switching circuits 11A and 11D, the signal "1" is given to the switching circuits 11B and 11E and the signal "0" is given to the switching circuits 11C and 11F. Thereby, since only the switching circuits 11A and 11D turn ON and the other switching circuits 11B, 11C, 11E, 11F become an OFF state, the data stored in the table 5A beforehand is given to the subtraction circuit 19A, and the data stored in the table 5D beforehand is given to the subtraction circuit 19B.

Also, since inputs to the 3-input NOR gate 9A become the data "001" set in the selecting register 12, its output becomes "0" and is given to the inverter 14 and NAND gate 13B. Thereby, the inverter 14 outputs the signal "1", so that the switching circuit 11G turns ON. Furthermore, to the NAND gate 13B, a reception finish signal FIN generated by the receiving register 3 at the end of data reception is also inputted. In this case, since the output of the NAND gate 13B is always "1", the interruption control register 7 is never to generate the interruption request signal INT by the reception finish signal FIN. Thus, in this case, it is decided to generate the interruption request signal INT responsive only to the subtraction results (lone by the subtraction circuits 19A, 19B.

As mentioned above, by setting data for the selecting register 12, a set, of switching circuits among the switching circuits 11A and 11D, 11B and 11E, 11C and 11F, corresponding to a set of selected tables and the switching circuit 11G turn ON, and the other switching circuits become an OFF state, so that data of a set of tables among the three sets of tables are given respectively to the subtraction circuits 19A, 19B. And hence, the same operation as in the aforesaid seventh embodiment is performed within the range, whose maximum and minimum values are the data written in a set of selected tables among the three sets of tables 5A and 5D, 5B and 5E, 5C and 5F beforehand.

It is to be understood that, by rewriting the content of the selecting register 12, three sets of data stored in the tables 5A and 5D, 5B and 5E, 5C and 5F beforehand can be selected according to their use.

While, when none of the tables 5A, 5B, 5C, 5D, 5E, 5F is selected, "0" is set in all of the bits 0, 1, 2 of the selecting register 12. In this case, the all switching circuits 11A through 11F become an OFF state and "0" is inputted to all of the inputs of the 3-input NOR gate 9A. Thereby, the output of the NOR gate 9A becomes "1" and the output of the inverter 14 becomes "0", so that the switching circuit 11G turns OFF. Furthermore, in this case, since "1" is always inputted to the NAND gate 13B from the NOR gate 9A, its output becomes an inverted signal of the reception finish signal FIN generated by the receiving register 3.

Thus, when the data is sent from the remote control system and stored in the receiving register 3 via the receiving terminal 24, the receiving register 3 outputs "1" as the reception finish signal FIN at the end of data reception. Thereby, since the NAND gate 13B outputs "0" to the interruption control register 7, and the register 7, in turn, generates the interruption request signal INT.

[Ninth Embodiment]

In the above-mentioned eighth embodiment, though it is so constituted that, any one set out of several sets of tables is selected, in other words, one data range out of several data ranges is selected, in the ninth embodiment, it is so constituted that, all or some of the sets among several sets of tables can be selected at , t e same time. Also, in the same way as in the eighth embodiment, it is so constituted that, the same operation as the prior art is possible when all of the tables are not selected.

In the following, the case of three sets of tables is described.

Figure 10:
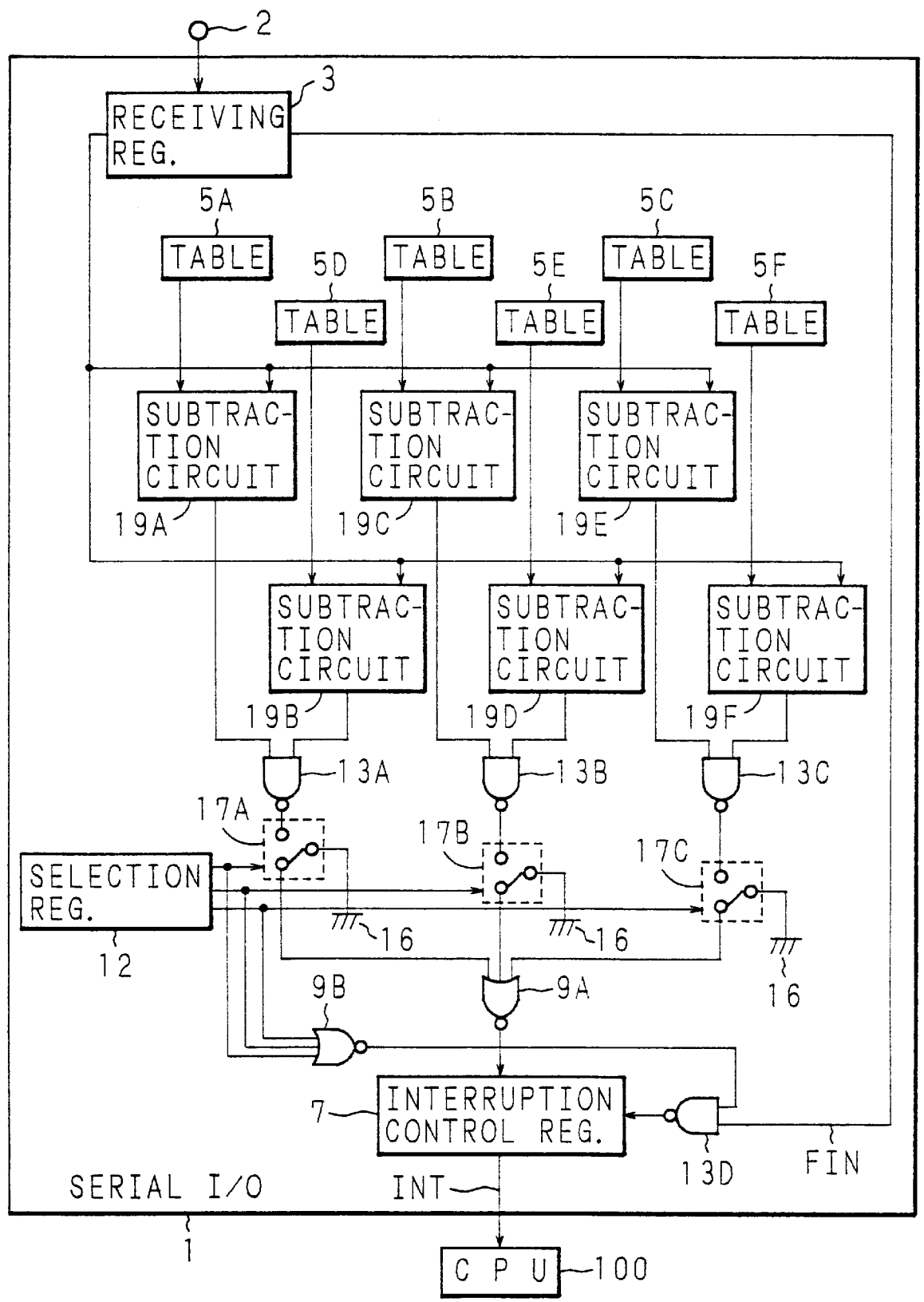
FIG. 10 is a block diagram showing a configuration example of a ninth embodiment of an interface apparatus of the present invention.

In FIG. 10, numerals 5A, 5B, 5C, 5D, 5E, 5F respectively designate the table capable of storing optional three sets of data therein in the same way as in the eighth embodiment.

In the ninth embodiment, six subtraction circuits 19A, 19B, 19C, 19D, 19E, 19F are provided corresponding to the sets of tables 5A and 5D, 5B and 5E, 5C and 5F. Data stored in the receiving register 3 are given commonly to the subtraction circuits 19A, 19B, 19C, l9D, 19E, 19F, as well as data stored in the table 5A is given to the subtraction circuit 19A, data stored in the table 5D is given to the subtraction circuit 19B, data stored in the table 5B is given to the subtraction circuit 19C, data stored in the table 5E is given to the subtraction circuit 19D, data stored in the table 5C is given to the subtraction circuit l9E, and data stored in the table 5F is given to the subtraction circuit 19F.

Thus, the subtraction circuit 19A performs subtraction between the data stored in the receiving register 3 and the data stored previously in the table 5A, and the subtraction circuit 19B performs subtraction between the data stored in the receiving register 3 and the data stored previously in the table 5D, to output respective carries to an NAND gate 13A.

While, the subtraction circuit 19C performs subtraction between the data stored in the receiving register 3 and the data stored previously in the table 5B, and the subtraction circuit 19D performs subtraction between the data stored in the receiving register 3 and the data stored previously in the table 5E, to output respective carries to an AND gate 13B.

And, the subtraction circuit 19E performs subtraction between the data stored in the receiving register 3 and the data stored previously in the table 5C, and the subtraction circuit 19F performs subtraction between the data stored in the receiving register 3 and the data stored previously in the table 5F, to output respective carries to an NAND gate 13C.

The configuration of the subtraction circuits 19A, 19B, 19C, 19D, 19E are same as the subtraction circuits 19 of the seventh embodiment shown in FIG. 8.

An output, signal of the NAND gate 13A is inputted to a 3-input NOR gate 9A via the switching circuit 17A, an output of the NAND gate 13B is inputted to the same via the switching circuit 17B, and an output of the NAND gate 13C is inputted to the same via the switching circuit 17C.

The switching circuits 17A, 17B, 17C are ON/OFF controlled by the selecting register 12. Specifically, the selecting register 12 has a 3-bit configuration corresponding to the switching circuit 17A, 17B, 17C, in which a bit 2 corresponds to the switching circuit 17C, a bit 1 corresponds to the switching circuit 17B and a bit 0 corresponds to the switching circuit 17A. When the bit, 0 is "1", the switching circuit 17A inputs an output of the NAND gate 13A to the NOR gate 9A, and when "0", inputs the signal "0" to the NOR gate 9A. When the bit 1 is "1", the switching circuit 17B inputs an output of the NAND gate 13B to the NOR gate 9A, and when "0", inputs the signal "0" to the NOR gate 9A. When the bit 2 is "1", the switching circuit 17C inputs an output of the NAND gate 13C to the NOR gate 9A, and when "0", inputs the signal "0" to the NOR gate 9A.

The configuration and operation of the receiving register 3 are same as those in the seventh embodiment except that, respective data outputs are given commonly to the subtraction circuits 19A, 19B, 19C, 19D, l9E, l9F. An output of the NOR gate 9A is given to the interruption control register 7.

Numeral 9B designates a 3-input NOR gate, to which a 3-bit signal of the selecting register 12 is inputted. An output of the NOR gate 9B and a reception finish signal FIN ("1" is outputted at the end of data reception, and "0" is outputted when not yet received) generated by the receiving register 3 at the end of data reception are given to a 2-input NAND gate 13D.

In the following, the operation of the ninth embodiment is described with reference to FIG. 10.

As an example, the operation in case of selecting two tables 5A and 5D, 5B and 5E at the same time is described.

It is assumed that data stored in the tables 5A, 5B, 5C, 5D, 5E, 5F beforehand are same as those in the aforesaid eighth embodiment.

When data "011" are set in the bits 2, 1, 0 of the selecting register 12 beforehand, the signal "1" is given to the switching circuit 17A, the signal "1" is given to the switching circuit 17B and the signal "0" is given to the switching circuit 17C. Thereby, since the switching circuits 17A and 17B turn ON and the other switching circuit 17C outputs the signal "0", the output signal of the NAND gate 13A and the output signal of the NAND gate 13B are given to the NOR gate 9A.

Thus, when carry signals of both the subtraction circuits 19A and 19B are "1", or when carry signals of both the subtraction circuits 19C and 19D are "1" (when interruption is necessary), the 3-input NOR gate 9A outputs the signal "0" to make the interruption control register 7 generate the interruption request, signal INT.

Also, since inputs of the 3-input NOR gate 9B are "011", its output becomes "0". Thus, since the NAND gate 13D always outputs "1" irrespective of the reception finish signal FIN outputted by the receiving register 3, the interruption control register 7 is never to generate the interruption request signal INT by the reception finish signal FIN outputted from the receiving register 3.

Even when selecting the other combination of tables, or selecting any one set of tables, or selecting all of the tables, the same operation as mentioned above is possible by setting the appropriate data in the selecting register 12.

Meanwhile, when none of the tables 5A, 5B, 5C, 5D, 5E, 5F is used, by setting "000" in the selecting register 12 as the data, the switching circuits 17A through 17C output the signal "0", thus all of three inputs of the NOR gate 9A become "0" and its output becomes "1". Thereby, the output signal of the NOR gate 9A, or in other words, none of the judging results by the subtraction circuits 19A, 19B, 19C, 19D, 19E, l9F has nothing to do with the interruption request signal TNT of the interruption control register 7.

Since all of the three inputs of the NOR gate 9B become "0" and its output, also becomes "1" in such a case, an output signal of the NAND gate 13D becomes an inverted signal of the reception finish signal FIN outputted from the receiving register 3. Thus, when the receiving register 3 outputs "1" at the end of data reception, the NAND gate 13D outputs the signal "0" to the interruption control register 7 to make it generate the interruption request signal INT.

[Tenth Embodiment]

The present embodiment is suitable in such a case when transmitting the commands, which are to be transmitted to the VTR from the remote control system, continuously is meaningless. Specifically, it is constituted such that, in case of receiving the same data continuously, when the processings by the CPU according to the interruption request generated at, the end of data reception of the data are same and the second processing is not, necessary, for example, when data of the commands for stopping and starting the tape play-back or starting the video recording are sent from the remote control system, the second or further interruption request caused by the same data is not generated.

In the following, the configuration and operation of the tenth embodiment is described with reference to FIG. 11.

Figure 11:
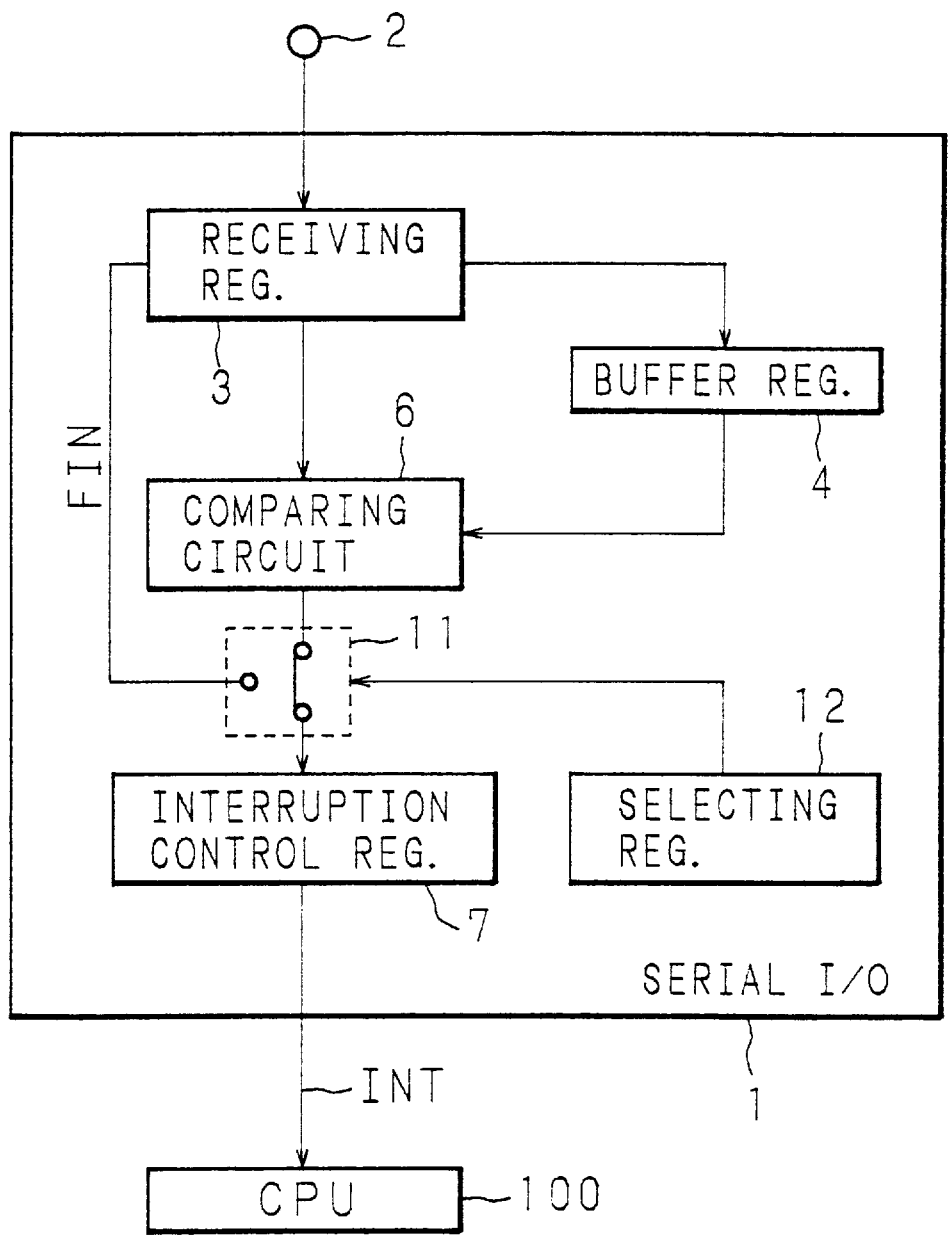
FIG. 11 is a block diagram showing a configuration example of a tenth embodiment of an interface apparatus of the present invent ion.

In FIG. 11, data received from the receiving terminal 2 is stored temporarily in the receiving register 3 as well as given to the comparing circuit 6. While, the preceding received data is stored in the buffer register 4, and is also given to the comparing circuit 6. The comparing circuit 6 compares the data given from the receiving register 3 and the buffer register 4, and when the comparison result shows coincidence, outputs the signal "1" to the interruption control register 7, and when the comparison result does not show coincidence, outputs the signal "0" to the same.

Also, in FIG. 11, numeral 11 designates a switching circuit, and numeral 12 designates a selecting register. When "1" is set in the selecting register 12, the switching circuit 11 gives an output signal of the comparing circuit 6 to the interruption control register 7, and when "0" is set, gives an reception finish signal FIN generated by the receiving register 3 being same as in the aforesaid embodiments to the interruption control register 7.

Now, it is assumed that, for example, "0" is set in the selecting register 12, the output, signal of the comparing circuit 6 is never to be given to the interruption control circuit 7, and the reception finish signal FIN generated by the receiving register 3 is given to the interruption control register 7. Thus, in this case, the interruption control register 7, in the same way as in the prior art, generates the interruption request signal INT every time the received data is newly stored in the receiving register 3.

Thus, when the serial I/O 1 receives the command for starting the video recording in the state where "0" is set in the selecting register 12, the interruption request signal INT is generated from the interruption control register 7 to start the video recording. At this time point, when "1" is set in the selecting register 12 and the data of the command for starting the video recording again is received via the receiving terminal 2, the data is stored into the receiving register 3. Then, the data stored in the receiving register 3 and the preceding received data stored in the buffer register 4 beforehand are compared by the comparing circuit 6.

When the data are identical, the comparing circuit 6 outputs the signal "1" and gives it to the interruption control register 7 via the switching circuit 11, and when they are different, outputs the signal "0" and gives it to the interruption control register 7 via the switching circuit 11. When the signal "1" is given from the comparing circuit 6, the interruption control register 7 does not generate the interruption request signal INT, and when the signal "0" is given, generates the interruption request signal INT.

Thus, as mentioned above, in the state where the data of the command for starting the video recording has been received and the video recording is being performed, since the data of the command for starting the video recording received previously is stored in the buffer register 4, when the data of the command for starting the video recording is received continuously, the comparing circuit 6 generates the signal "1". And hence, the interruption request signal INT is never to be generated from the interruption control register 7 and the CPU 100 is never to execute the same processing caused by the same data received continuously.

The buffer register 4 includes a circuit for initializing itself by a reset signal, not shown, at the time of resetting the microcomputer.

In this way, in the tenth embodiment, when "1" is set in the selecting register 12, in case of receiving the same data twice or more continuously, the interruption control register 7 generates the interruption request signal INT only at the first reception.

[11th Embodiment]

The above-mentioned tenth embodiment is so constituted that, the second or following interruption request caused by the same received data is not generated. However, on the contrary, it goes without saying that it is possible to constitute such that, the interruption request is generated only when the same data is received continuously. In the following, such case of the 11th embodiment is described with reference to FIG. 12.

Figure 12:
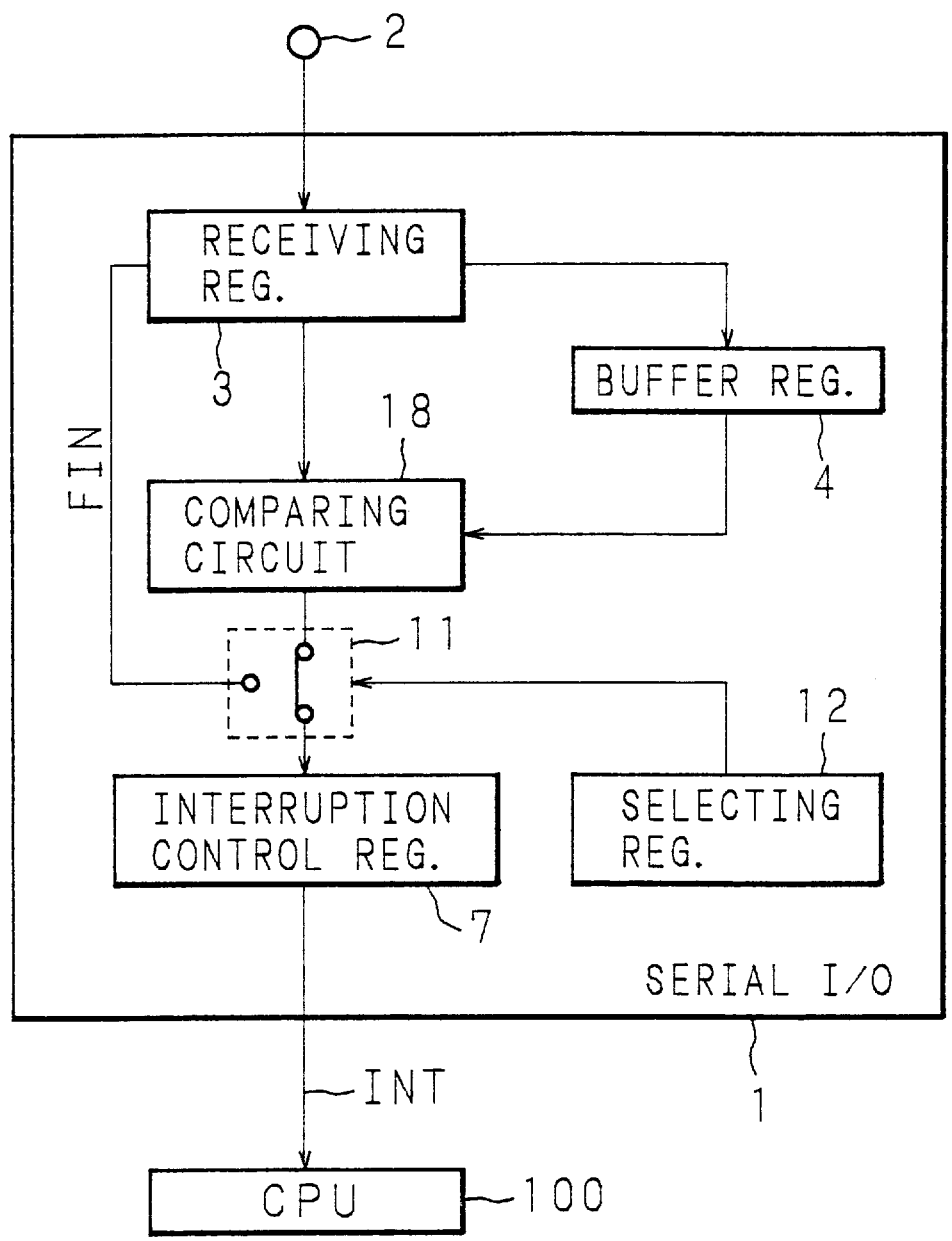
FIG. 12 is a block diagram showing a configuration example of an 11th embodiment of an interface apparatus of the present invention.

A difference between the configuration of the 11th embodiment shown in FIG. 12 and that of the aforementioned tenth embodiment is only that, in the tenth embodiment, the comparing circuit 6, which outputs the signal "1" when the comparison result between the data stored in the receiving register 3 and that stored in the buffer register 4 shows coincidence, and outputs the signal "0" when the result does not show coincidence, is provided, and in the 11th embodiment, a comparing circuit 18, which outputs the signal "1" when the comparison result does not show coincidence, and outputs the signal "0" when the result shows coincidence is provided.

Thus, when "1" is set in the selecting register 12 and the serial I/O 1 starts the receiving operation, the received data is stored into the receiving register 3 via the receiving terminal 2. Then, in the comparing circuit 18, the data stored in the receiving register 3 and the preceding received data stored in the buffer register 4 are compared with each other. When the data are identical, the signal "0" is outputted and when the data are different, the signal "1" is outputted from the comparing circuit 18 and are given to the interruption control register 7, respectively. When the signal "0" is given from the comparing circuit 18, the interruption control register 7 is to generate the interruption request signal INT, and when the signal "1" is given, is not, to generate the interruption request signal INT.

Finally, when the two data have been compared with each other by the comparing circuit 18, data stored in the receiving register 3 is sent to and stored in the buffer register 4.

The buffer register 4 includes a circuit for initializing itself by a reset signal, not shown, at the time of resetting the microcomputer.

In this way, in the 11th embodiment, the interruption control register 7 generates the interruption request signal INT when the same data is received twice or more continuously.

When "0" is set in the selecting register 12, in the same way as in the aforementioned tenth embodiment, the interruption request signal INT generated by the receiving register 3 is given to the interruption control register 7 to perform the same operation as before.

[12th Embodiment]

A 12th embodiment is the embodiment in which a conception of the 11th embodiment is developed further. That is, relative to the signal "0" sent from the comparing circuit, 18 to the interruption control register 7 realized in the 11th embodiment in order to generate the interruption request signal INT, the 12th embodiment is so constituted that, the signal "0" is generated by the interruption control register 7 only when a predetermined value is obtained by counting the signal so as to prevent a sending/receiving error caused by noises or an operation error and the like at, sending and receiving important data.

For example, when the VTR is made to perform video recording, since new video signals are usually overwritten on a tape, the video signals which are recorded already are erased. Thus, in such a case, when it is so constituted that, the interruption request signal INT is to be generated only after confirming that data received by the serial I/O 1 for several times are identical, the operation error or noises can be prevented.

Figure 13:
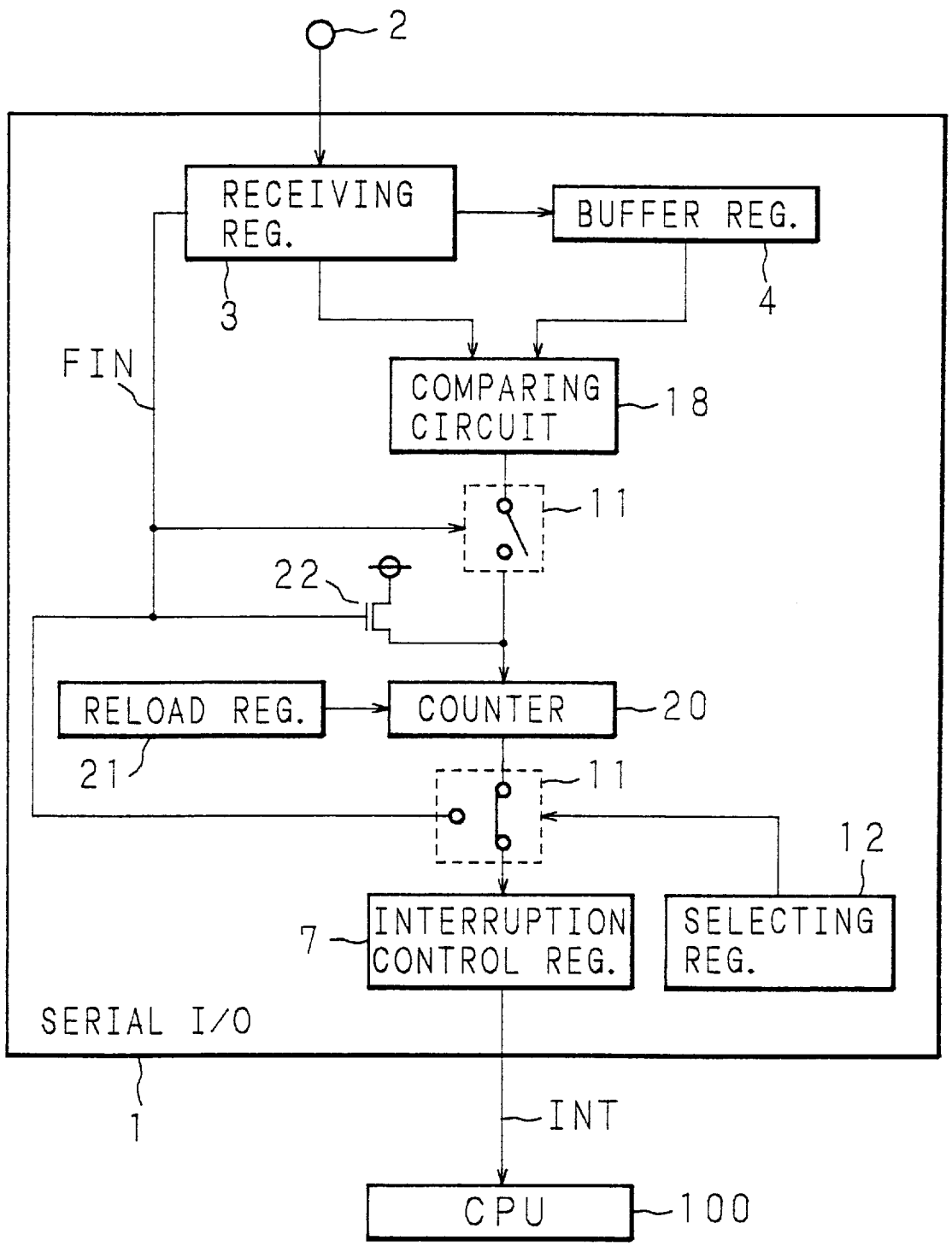
FIG. 13 is a block diagram showing a configuration example of a 12th embodiment of an interface apparatus of the present invention.

The configuration and operation of the present embodiment are, basically, same as those in the aforementioned 11th embodiment. In FIG. 13, numerals 3, 4, 7, 11, 12 and 18 respectively designate a receiving register, a buffer register, an interruption control register, a switching circuit, a selecting register and a comparing circuit, in the same way as in the 11th embodiment shown in FIG. 12.

In the 12th embodiment, a counter 20 counting the frequency of output of the signal "0" from the comparing circuit 18 is provided between the comparing circuit 18 and the interruption control register 7, and the switching circuit 111 which turns OFF when a reception finish signal FIN generated by the receiving register 3 is "0", and turns ON when it is "1", is provided between the counter 20 and the comparing circuit 18. A reload register 21 which sets an initial value of the counting operation in the counter 20 is also provided.

Numeral 22 designates a P-channel transistor. The P-channel transistor 22 is the one to whose gate the reception finish signal FIN generated by the receiving register 3 is given, to whose source a power potential (signal "1") is given and whose drain is connected to an input of the counter 20.

The counter 20 counts the signal "0" which is generated when the comparison result, of the data stored in the receiving register 3 and that stored in the buffer register 4, by the comparing circuit 18, shows coincidence. The counter 20 utilizes a down counter known as the prior art, counts the signal "0" by the frequencies preset in the reload register 21 and underflows when reaching the set value. When the counter 20 underflows, the signal "0" is given to the interruption control register 7 to generate the interruption request signal INT.

Until the receiving register 3 finishes the reception, the reception finish signal FIN is "0" and is given to the switching circuit 111 and the P-channel transistor 22. And hence, since the switching circuit 111 is turned off and the signal "1" is outputted to the counter 20 from the P-channel transistor 22, until the reception finish signal FIN changes from "0" to "1" the comparison result done by the comparing circuit 18 become "0", the input to the counter 20 is kept at "1". Thus, the counter 20 starts counting the output signal "0" from the comparing circuit 18, by the fact that the data reception from the receiving terminal 2 is finished and that the reception finish signal FIN outputted from the receiving register 3 becomes "1" to turn on the switching circuit 111.

Also in the 12th embodiment, in the same way as in the aforesaid 11th embodiment shown in FIG. 12, the switching circuit, 11 is connected between the counter 20 and the interruption control register 7 so that the reception finish signal FIN generated by the receiving register 3 is given directly to the interruption control register 7 when "0" is set in the selecting register 12, and the signal generated by the counter 20 is given to the interruption control register 7 when "1" is set in the selecting register 12.

Figure 14:
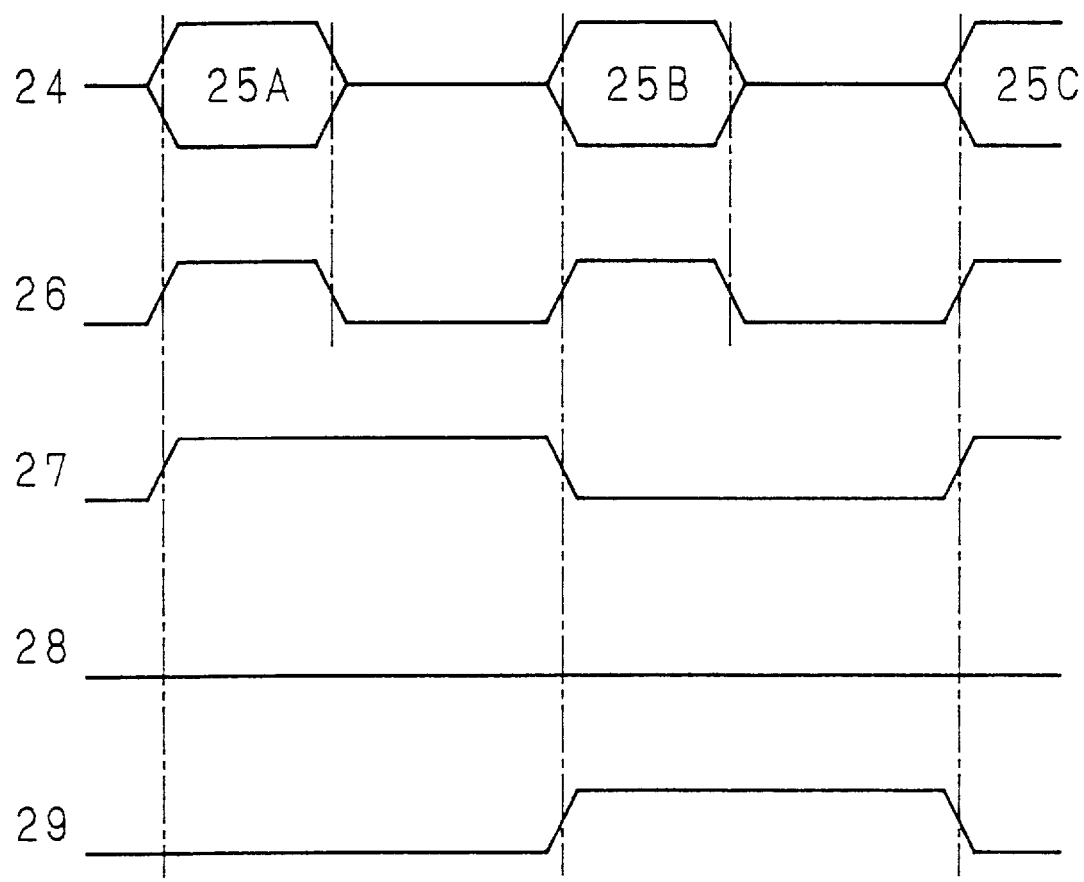
FIG. 14 is a timing chart for explaining the operation of a 13th embodiment of an interface apparatus of the present invention.

Next, a timing of the counting operation by the counter 20 is described with reference to a timing chart shown in FIG. 14. In FIG. 14, numeral 24 designates signals of comparison results outputted from the comparing circuit 18, numeral 25 designates effective periods of the signals 24 of comparison result, numeral 26 designates the reception finish signal FIN ("1" is outputted at the end of data reception, and "0" is outputted when not yet received) generated by the receiving register 3, numeral 27 designates a count timing of the counter 20 when the signals 25A, 25B, 25C of comparison results outputted from the comparing circuit 18 are "0", numeral 28 designates a count timing of the counter 20 when the signals 25A, 25B, 25C of comparison results are "1", and numeral 29 designates a count timing of the counter 20 when the signal 25A of comparison result is "1" and the signals 25B, 25C of the same are "0".

The counting operation timing of the counter 20 is as follows.

At the time of outputting the signal of comparison result to the counter 20 by the comparing circuit 18, the switching circuit 11 is controlled by the reception finish signal FIN. The output signal of the comparing circuit 18 becomes valid during a period of the reception finish signal FIN is "1", and becomes invalid during a period of the same is "0". The counter 20 counts the signal "0" by detecting a falling of the signal outputted by the comparing circuit 18 when the output signal of the comparing circuit 18 is valid, in other words, when the reception finish signal FIN is "1".

For example, when all of the signals 25A, 25B, 25C of comparison results are "0", the count timing of the counter 20 is as designated by the numeral 26, when all of the signals 25A, 25B, 25C of comparison results are "1", it is as designated by the numeral 27 and the counting is not performed, and when the signal 25A of comparison result is "1" and the signals 25B, 25C of the same are "0", the timing is as designated by the numeral 28.

The counter 20 counts the frequency of the output signal "0" of the comparing circuit 18 in such a manner, and when it underflows is due time, the interruption request signal INT is outputted from the interruption control register 7.

As mentioned above, in the 12th embodiment, in the state where "1" is set in the selecting register 12, since the interruption control register 7 generates the interruption request signal INT only when the same data is received continuously by the times preset in the reload register 21, a sending/receiving error caused by noises and the like can be prevented when applied in sending and receiving important data. In the state where "0" is set in the selecting register 12, in the same way as in the prior art, as soon as the new data is received by the receiving register 3, the interruption request signal INT is generated from the interruption control register 7. And hence, a function of the 12th embodiment can be utilized at need.

[13th Embodiment]

The present invention is suitable for the case where data the command sent to the VTR successively from the remote control system are all different. Specifically, it is suitable for such a case where a user instructs necessary items for reserving video recording successively by the remote control system as watching a display on a TV screen.

In the following, the configuration and operation of the 13th embodiment are described with reference to FIG. 15.

Figure 15:
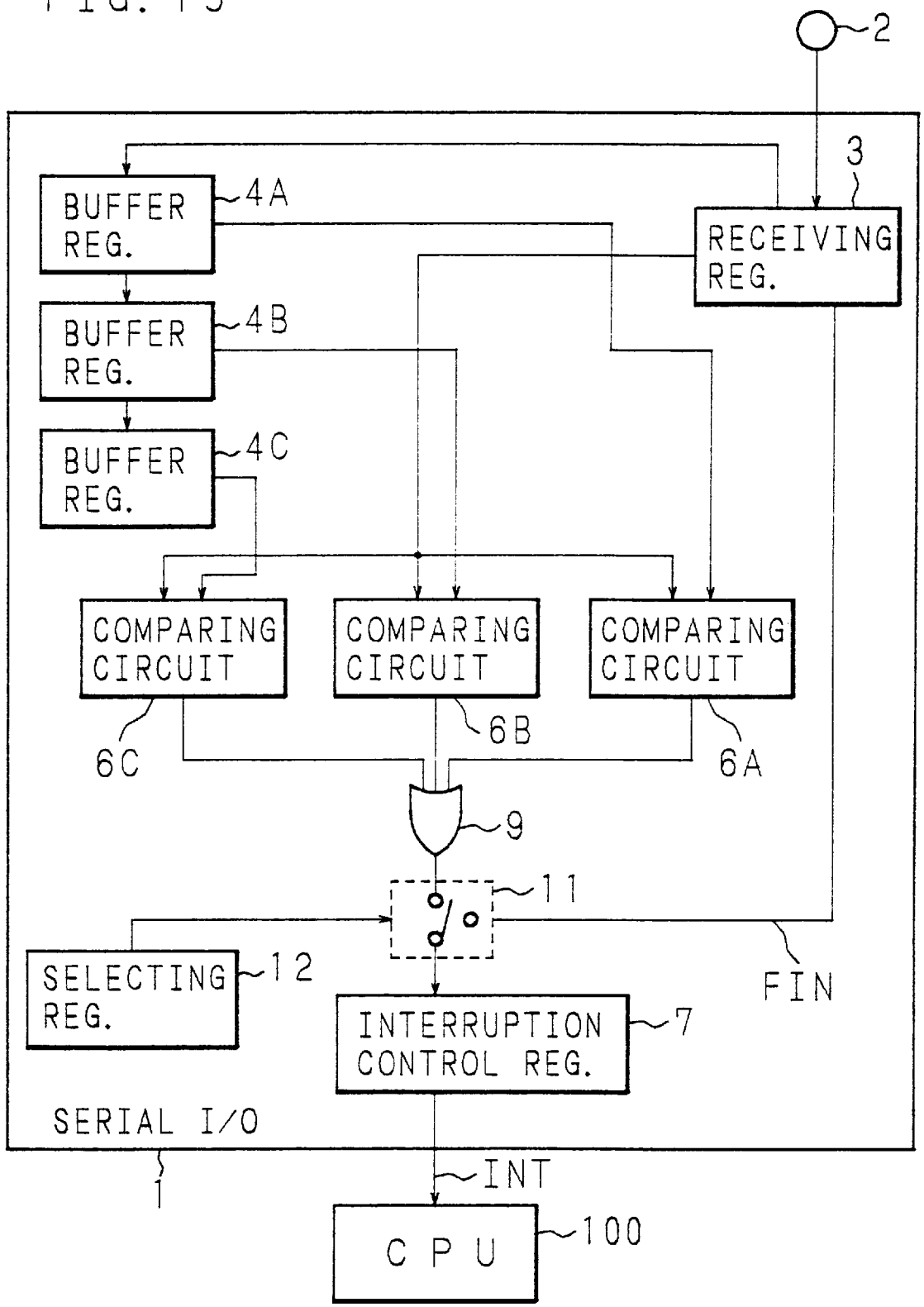
FIG. 15 is a block diagram showing a configuration example of the 13th embodiment of the interface apparatus of the present invention.

In FIG. 15, data received through the receiving terminal 2 is stored temporarily into the receiving register 3 and is given to the comparing circuits 6A, 6B, 6C. While, in an example shown in FIG. 15, three buffer registers 4A, 4B, 4C and three comparing circuits 6A, 6B, 6C are provided.

Also in the 13th embodiment, in the same way as in the aforesaid 11th embodiment shown in FIG. 12, the switching circuit 11 is connected between the OR gate 9 and the interruption control register 7 so that the reception finish signal FIN generated by the receiving register 3 is given directly to the interruption control register 7 when "0" is set in the selecting register 12, and the signal generated by the counter 20 is given to the interruption control register 7 when "1" is set in the selecting register 12.

The comparing circuit 6A compares the data stored in the receiving register 3 and that stored in the buffer register 4A, the comparing circuit 6B compares the data stored in the receiving register 3 and that stored in the buffer register 4B, and the comparing circuit 6C compares the data stored in the receiving register 3 and that stored in the buffer register 4C. The comparing circuits 6A, 6B, 6C respectively output the signal "1" when the comparison result, of the respective two data shows coincidence, and output the signal "0" when the result does not show coincidence. output signals of the comparing circuits 6A, 6B, 6C are given to a 3-input OR date 9. Thus, the OR gate 9 outputs the signal "1" when even one of the comparison results by the comparing circuits 6A, 6B, 6C shows coincidence, and outputs the signal "0" when all of the comparison results do not show coincidence. An output signal of the OR gate 9 is given to the interruption control register 7. When the output signal of the OR gate 9 is "0", the interruption control register 7 generates the interruption request signal INT, and when it is "1", does not generate the interruption request signal INT.

The buffer registers 4A, 4B, 4C are connected in series, and when comparing operation by the comparing circuits 6A, 6B, 6C are finished, data stored in the receiving register 3 is transferred to and stored in the buffer register 4A, and data stored in the buffer register 4A hitherto is transferred to and stored in the buffer register 4B, and data stored in the buffer register 4B hitherto is transferred to and stored in the buffer register 40. Thus, in the buffer registers 4A, 4B, 4C, three received data are stored rectroactively when the new data is received in the receiving register 3.

In the following, the operation of the 13th embodiment is described with reference to FIG. 15.

When data is transmitted from the outside, it is received through the receiving terminal 2 and stored in the receiving register 3. When storing of the new data has been finished in the receiving register 3, the received data stored in the receiving register 3 and data stored respectively in the buffer registers 4A, 4B, 4C are compared by the comparing circuits 6A, 6B, 6C at the same time, and the respective comparison results are given to the OR gate 9.

Since the signal "1" is outputted from the OR gate 9 when even one of the comparison results by the comparing circuits 6A, 6B, 6C shows coincidence, the interruption control register 7 is never to generate the interruption request. signal INT. Since the signal "0" is outputted from the OR gate 9 only when the comparison results by all of the comparing circuits 6A, 6B, 6C do not show coincidence, the interruption control register 7 generates the interruption request signal INT.

As mentioned above, in the 13th embodiment, in case of receiving a series of data, the interruption request signal INT is not to be generated when the data of the same command is sent twice. This is effective at a series of operation of such a case where a user instructs necessary items for reserving video recording successively by the remote control system as watching a display on a TV screen. That is, in case of such serial operation, since it is meaningless to send the data of the same command twice, the interruption request signal INT is prevented from being generated when the data of the same command is sent twice or more from the remote control system.

Also, in the 13th embodiment, in the state where "0" is set in the selecting register 12, in the same way as in the prior art, as soon as the new data is received in the receiving register 3, the interruption request signal INT is generated from the interruption control register 7. And hence, the function of the 13th embodiment can be utilized at need.

As particularly described heretofore, according to the first aspect of the interface apparatus according to the present invention, when newly received data, preceding received data and data designated beforehand coincide with each other, an interruption signal is not to be generated. Thus, when a certain data is received and the processing corresponding thereto is executed, the internal interruption is not to be generated even when the same data are received continuously thereafter, as far as the data is designated beforehand, so that the load on the CPU due to the internal interruption request is reduced, and at the same time, it is possible for the CPU to execute the other processings.

According to the second aspect of the interface apparatus according to the present invention, one among a plurality of data designated beforehand is selected for same operation as in the first aspect. Thus, when some data are designated beforehand, and the data is selected when receiving a certain data and executing the processing corresponding thereto, the internal interruption is not to be generated even when receiving the same data continuously thereafter, so that the load on the CPU due to the internal interruption request is reduced as well as it is possible for the CPU to execute the other processings.

In the third aspect of the interface apparatus according to the present invention, one or some data among a plurality of data designated beforehand are selected for same operation as in the first aspect. Thus, when some data are designated beforehand, and the data and some associated data are selected in case of receiving a certain data and executing the processing corresponding thereto, the internal interruption is not, to be generated even when receiving the same data continuously thereafter, so that the load on the CPU due to the internal interruption request is reduced, as well as it is possible for the CPU to execute the other processings.

In the fourth aspect, of the interface apparatus according to the present invention, when the newly received data and the data designated beforehand do not coincide with each other, the internal interruption signal is not to be generated Thus, when a data, which is meaningful in case of being received next during executing the processing corresponding to a certain preceding received data, is designated beforehand, even when receiving a meaningless data thereafter, the internal interruption is not to be generated, so that the load on the CPU due to the internal interruption request is reduced as well as it is possible for the CPU to execute the other processings.

In the fifth aspect of the interface apparatus according to the present invention, one of a plurality of data designated beforehand is selected for same operation as in the fourth aspect. Thus, when some data, which is meaningful in case of being received next during executing the processing to a certain preceding received data are designated beforehand and any one of them is selected, even when receiving a selected meaningless data thereafter, the internal interruption is not to be generated, so that the load on the CPU due to the internal interruption request is reduced as well as it is possible for the CPU to execute the other processinigs.

In the sixth aspect of the interface apparatus according to the present invention, one or some of a plurality of data designated beforehand are selected for same operation as in the fourth aspect. Thus, when some data, which are meaningful in case of being received next during executing the processing corresponding to a certain preceding received data are designated beforehand and one or some of them are selected, even when receiving some selected meaningless data thereafter, the internal interruption is not to be generated, so that the load on the CPU due to the internal interruption request is reduced as well as it is possible for the CPU to execute the other processings.

In the seventh aspect of the interface apparatus according to the present invention, when a newly received data is outside a range of data of two kinds of numeric values designated beforehand, the internal interruption signal is not to be generated. Thus, when some data, which are meaningful in case of being received next during executing the processing corresponding to certain preceding received data are allocated as the numeral data of certain range and the range is designated beforehand, even when receiving the data within the range thereafter, the internal interruption is not to be generated, so that the load on the CPU due to the internal interruption request is reduced as well as it is possible for the CPU to execute the other processings.

In the eighth aspect of the interface apparatus according to the present invention, a s et of data of two kinds of numeric values of a plurality of combinations is selected for same operation as in the seventh aspect.

In the ninth aspect of the interface apparatus according to the present invention, a set or more of data of two kinds of numeric values of a plurality of combinations are selected for same operation as in the seventh aspect.

In the tenth aspect of the interface apparatus according to the present invention, the internal interruption signal is not to be generated when a newly received data and the preceding received data coincide with each other. Thus, the internal interruption is not to be generated as to data which is meaningless when received continuously, so that the load on the CPU is, reduced.

In the 11th aspect of the interface apparatus according to the present invention, the internal interruption signal is not to be generated when a newly received data and the preceding received data do not coincide with each other. Thus, since the internal interruption is generated only when receiving the same data, at least, twice continuously, it is effective for preventing noises.

In the 12th aspect of the interface apparatus according to the present invention, the internal interruption signal is to be generated when a newly received data and the preceding received data coincide with each other respectively for predetermined times. Thus, since the internal interruption is to be generated only when receiving the same data continuously for, at least,, predetermined times, it is effective for preventing noises and operation error.

In the 13th aspect of the interface apparatus according to the present invention, the internal interruption signal is to be generated only when a newly received data and all of the data received for several times previously do not, coincide with each other. Thus, the internal interruption is not generated unnecessarily at the time when different data are given successively.

As this invention may be embodied in several forms without departing from the spirit of essential characteristics thereof, the present, embodiment is therefore illustrative and not restrictive, since the scope of the invention is defined by the appended claims rather than by the description preceding them, and all changes that fall within the meets and bounds of the claims, or equivalents of such meets and bounds thereof are therefore intended to be embraced by the claims.

What is claimed is:

1. An interface apparatus including interruption generating means for generating an internal interruption signal when receiving data from the outside, comprising:
    received data storing means for storing data received newly;
    preceding data storing means for storing data received precedingly; designated data storing means for storing optional data designated beforehand; and
    comparing means for comparing the data stored in said received data storing means, the data stored in said preceding data storing means and the data stored in said designated data storing means, and for making said interruption generating means generate the internal interruption signal only when the comparison result of the three data does not show coincidence; wherein
    a plurality of said designated data storing means are provided, further comprising:
        selective information storing means for storing an information selecting one of said plurality of designated data storing means; and
        a plurality of switching means for connecting or cutting said plurality of designated data storing means and said comparing means respectively, according to the information stored in said selective information storing means.

2. The interface apparatus as set forth in claim 1, further comprising:
    means for making said interruption generating means to generate an internal interruption signal at the time point when said received data storing means receives data newly, in the case where said selective information storing means does not select any of said designated data storing means.

3. An interface apparatus including interruption generating means for generating an internal interruption signal when receiving data from the outside, comprising:
    received data storing means for storing data received newly;
    preceding data storing means for storing data received precedingly;
    designated data storing means for storing optional data designated beforehand; and
    comparing means for comparing the data stored in said received data storing means, the data stored in said preceding data storing means and the data stored in said designated data storing means, and for making said interruption generating means generate the internal interruption signal only when the comparison result of the three data does not show coincidence; wherein
    a plurality of said designated data storing means and
    a plurality of said comparing means connected respectively to said plurality of designated data storing means are provided, further comprising:
        selective information storing means for storing an information selecting one or more of said plurality of designated data storing means; and
        a plurality of switching means for giving the comparison result of the data stored in said received data storing means and the data stored in one or more of said plurality of designated data storing means, done by corresponding comparing means according to the information stored in said selective information storing means, to said interruption generating means.

4. The interface apparatus as set forth in claim 3, further comprising:
    means for making said interruption generating means to generate an internal interruption signal at the time point when said received data storing means receives data newly, in the case where said selective information storing means dose not select any of said designated data storing means.

5. An interface apparatus built in a microcomputer including interruption generating means for generating an internal interruption signal when receiving data from outside of the microcomputer, comprising:
    received data storing means for storing data newly received from outside of the microcomputer;
    designated data storing means for storing optional data designated beforehand; and
    comparing means for comparing the newly received data stored in said received data storing means and the data stored in said designated data storing means, and for making said interruption generating means generate the internal interruption signal only when the comparison result shows coincidence; wherein
    a plurality of said designated data storing means are provided, further comprising:
        selective information storing means for storing an information selecting one of said plurality of designated data storing means; and
        a plurality of switching means for connecting or cutting said plurality of designated data storing means and said comparing means respectively, according to the information stored in said selective information storing means.

6. The interface apparatus as set forth in claim 5, further comprising:
    means for making said interruption generating means to generate an internal interruption signal at the time point when said received data storing means receives data newly, in the case where said selective information storing means dose not select any of said designated data storing means.

7. The interface apparatus as set forth in claim 5, wherein
a plurality of said designated data storing means and
a plurality of said comparing means connected respectively to said plurality of designated data storing means are provided,
further comprising:
selective information storing means for storing an information selecting one or more of said plurality of designated data storing means; and
a plurality of switching means for giving the comparison result of the data stored in said received data storing means and the data stored in one or more of said plurality of designated data storing means, done by corresponding comparing means according to the information stored in said selective information storing means, to said interruption generating means.

8. The interface apparatus as set forth in claim 7, further comprising:
means for making said interruption generating means to generate an internal interruption signal at the time point when said received data storing means receives data newly, in the case where said selective information storing means dose not select any of said designated data storing means.

9. An interface apparatus including interruption generating means for generating an internal interruption signal when receiving data from the outside, comprising:
received data storing means for storing data received newly;
first numeric data storing means for storing a first numeric data;
second numeric data storing means for storing a second numeric data which is different from said first numeric data;
first judging means for judging sizes of the data value stored in said received data storing means and the numeric data stored in said first numeric data storing means;
second judging means for judging sizes of the data value stored in said received data storing means and the numeric data stored in said second numeric data storing means; and
control means for making said interruption generating means generate the internal interruption signal only when said two judging means judge that the data value stored in said received data storing means is within a range of the numeric data stored in said two numeric data storing means.

10. The interface apparatus as set forth in claim 9, wherein
a plurality of said first numeric data storing means, and
a plurality of said second numeric data storing means corresponding respectively two said first numeric data storing means are provided,
further comprising:
selective information storing means for storing an information selecting one or more of said plurality of first numeric data storing means and one or more of said plurality of second numeric data storing means as a set; and
a plurality of switching means for connecting or cutting said plurality of first numeric data storing means and said first judging means, and said plurality of second numeric data storing means and said second judging means, according to the information stored in said selective information storing means.

11. The interface apparatus as set forth in claim 10, further comprising:
means for making said interruption generating means to generate an internal interruption signal at the time point when said received data storing means receives data newly, in the case where said selective information storing means dose not select any set of said numeric data storing means.

12. The interface apparatus as set forth in claim 9, wherein
a plurality of said first numeric data storing means,
a plurality of said second numeric data storing means corresponding respectively to said plurality of first numeric data storing means,
a plurality of said first judging means connected respectively to said plurality of first numeric data storing means, and
a plurality of said second judging means connected respectively to said plurality of second numeric data storing means are provided,
further comprising:
selective information storing means for storing an information selecting one or more of said plurality of first numeric data storing means and one or more of said plurality of second numeric data storing means as a set; and
a plurality of switching means for giving the judging result of the numeric data stored in a set or more sets of said first numeric data storing means and second numeric data storing means done h)y corresponding said judging means according to the information stored in said selective information storing means, to said interruption generating means.

13. The interface apparatus as set forth in claim 12, further comprising:
means for making said interruption generating means to generate art internal interruption signal at the time point when said received data storing means receives data newly, in the case where said selective information storing means dose not select any set of said numeric data storing means.

14. An interface apparatus built in a microcomputer including interruption generating means for generating an internal interruption signal when receiving data from outside of the microcomputer, comprising:
received data storing means for storing data newly received from outside of the microcomputer;
preceding data storing means for storing data precedingly received from outside the microcomputer; and
comparing means for comparing the newly received data stored in said received data storing means and the precedingly received data stored in said preceding data storing means, and for making said interruption generating means generate the internal interruption signal only when the comparison result does not show coincidence,
said interface apparatus further comprising:
means for making said interruption generating means to generate an internal interruption signal at the time point when said received data storing means receives data newly.

15. Interface apparatus built in a microcomputer including interruption generating means for generating an internal interruption signal when receiving data from outside of the microcomputer, comprising:
received data storing means for storing data newly received from outside the microcomputer;

preceding data storing means for storing data precedingly received from outside the microcomputer; and comparing means for comparing the newly received data stored in said received data storing means and the precedingly received data stored in said preceding data storing means, and for making said interruption generating means generate the internal interruption signal only when the comparison result shows coincidence, said interface apparatus further comprising:

storing means for setting numeric data beforehand; and counting means for counting the times in which the comparison result done by said comparing means does not show coincidence, and for making said interruption generating means generate an internal interruption signal only when the counting times reaches the numeric data stored in said storing means.

16. The interface apparatus as set forth in claim 15, further comprising:

means for making said interruption generating means to generate an internal interruption signal at the time point when said received data storing means receives data newly.

* * * * *

UNITED STATES PATENT AND TRADEMARK OFFICE
CERTIFICATE OF CORRECTION

PATENT NO. : 5,842,078
DATED : November 24, 1998
INVENTOR(S) : Tsuyoshi TOGASHI et al It is certified that error appears in the above-identified patent and that said Letters Patent is hereby corrected as shown below:

On the Title Page, under References Cited [56], please insert:

--FOREIGN PATENT DOCUMENTS
EP 0628913 A1   12/1994   Europe--

Signed and Sealed this

Thirteenth Day of July, 1999

Attest:

Attesting Officer

Q. TODD DICKINSON

Acting Commissioner of Patents and Trademarks